United States Patent
Ando et al.

(10) Patent No.: US 8,307,186 B2
(45) Date of Patent: Nov. 6, 2012

(54) COMPUTER SYSTEM PERFORMING CAPACITY VIRTUALIZATION BASED ON THIN PROVISIONING TECHNOLOGY IN BOTH STORAGE SYSTEM AND SERVER COMPUTER

(75) Inventors: Nobuhiko Ando, Yokohama (JP); Takato Kusama, Kawasaki (JP); Nobuo Beniyama, Yokohama (JP); Yoshiki Fukui, Yokohama (JP); Katsutoshi Asaki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 478 days.

(21) Appl. No.: 12/620,025

(22) Filed: Nov. 17, 2009

(65) Prior Publication Data

US 2011/0066823 A1    Mar. 17, 2011

(30) Foreign Application Priority Data

Sep. 11, 2009   (JP) ................................. 2009-210763

(51) Int. Cl.
  *G06F 12/02*   (2006.01)
(52) U.S. Cl. ................................. 711/171; 711/E12.002
(58) Field of Classification Search .......................... None
  See application file for complete search history.

(56) References Cited

U.S. PATENT DOCUMENTS

| 7,509,454 B2 | 3/2009 | Kano | |
| 2006/0277386 A1 | 12/2006 | Eguchi | |
| 2009/0240867 A1* | 9/2009 | Shibayama et al. | 711/100 |
| 2010/0125715 A1* | 5/2010 | Takamatsu et al. | 711/170 |
| 2010/0191908 A1* | 7/2010 | Yamakawa | 711/114 |

FOREIGN PATENT DOCUMENTS

JP    2006-338341 A    12/2006

* cited by examiner

*Primary Examiner* — Denise Tran
(74) *Attorney, Agent, or Firm* — Foley & Lardner LLP

(57) ABSTRACT

The management system identifies a server level virtual volume corresponding to a storage level pool on the basis of storage management information and server management information, and displays information relating to the correspondence between the storage level pool and the server level virtual volume. The storage management information represents correspondence between a storage level virtual volume to which a portion of an area is allocated from the storage level pool by thin provisioning technology at the storage level, and the storage level pool. The server management information represents correspondence between a server level virtual volume to which a portion of an area is allocated from the storage level virtual volume belonging to a server level pool by thin provisioning technology at the server level, and the storage level virtual volume.

13 Claims, 36 Drawing Sheets

| LLP IDENTIFIER | LLP CAPACITY | LLP ALLOCATED CAPACITY | CORRESPONDING LL-VVOL IDENTIFIER | CORRESPONDING LL-VVOL TOTAL CAPACITY | POOL CONFIGURATION LOGIC VOL IDENTIFIER | STORAGE APPARATUS IDENTIFIER |
|---|---|---|---|---|---|---|
| STPOOL-1 | 10000MB | 7000MB | STVVOL-1 STVVOL-2 | 20000MB | STLDEV-1 STLDEV-2 | STORAGE-1 |
| STPOOL-2 | 20000MB | 20000MB | STVVOL-3 | 30000MB | STLDEV-3 STLDEV-4 | STORAGE-2 |
| .. | .. | .. | .. | .. | .. | .. |
| .. | .. | .. | .. | .. | .. | .. |
| 1401 | 1402 | 1403 | 1404 | 1405 | 1406 | 1407 |

FIG. 7

| LL-VVOL IDENTIFIER | LL-VVOL CAPACITY | LL-VVOL ALLOCATED CAPACITY | CORRESPONDING LLP IDENTIFIER |
|---|---|---|---|
| STVVOL-1 | 10000MB | 3000MB | STPOOL-1 |
| STVVOL-2 | 10000MB | 4000MB | STPOOL-1 |
| STVVOL-3 | 10000MB | 5000MB | STPOOL-2 |
| STVVOL-4 | 20000MB | 10000MB | STPOOL-2 |
| .. | .. | .. | .. |

FIG. 8

| INTERNAL VOL ID | PORT NO. | LUN |
|---|---|---|
| STVVOL-1 | PORT-XXX.XXX | LUN-0 |
| STVVOL-2 | PORT-XXX.YYY | LUN-1 |
| STVVOL-3 | PORT-XXX.ZZZ | LUN-2 |
| ⋮ | ⋮ | ⋮ |
| ⋮ | ⋮ | ⋮ |

| HLP IDENTIFIER | HLP CAPACITY | HLP ALLOCATED CAPACITY | CORRESPONDING HL-VVOL IDENTIFIER | CORRESPONDING HL-VVOL TOTAL CAPACITY | VOL SOURCE STORAGE APPARATUS | CONFIGURATION STORAGE PORT NO. / LUN |
|---|---|---|---|---|---|---|
| SVPOOL-1 | 20000MB | 10000MB | SVVVOL-1 | 50000MB | STORAGE-1 | PORT-XXX.XXX LUN-0 PORT-XXX.XXX LUN-1 |
| SVPOOL-2 | 20000MB | 17000MB | SVVVOL-2 SVVVOL-3 | 30000MB | STORAGE-2 STORAGE-3 | PORT-XXX.YYY LUN-1 |
| .. | .. | .. | .. | .. | .. | .. |

| HL-VVOL IDENTIFIER | HL-VVOL CAPACITY | HL-VVOL ALLOCATED CAPACITY | HL-VVOL UNALLOCATED CAPACITY | HL-VVOL USED CAPACITY | CORRESPONDING HLP IDENTIFIER | CORRESPONDING VIRTUAL MACHINE IDENTIFIER | DEVICE IDENTIFIER FOR VIRTUAL MACHINE RECOGNITION |
|---|---|---|---|---|---|---|---|
| SvVVol-1 | 30000MB | 5000MB | 25000MB | 3500MB | SvPool-1 | VM-1 | HDD-1 |
| SvVVol-2 | 20000MB | 5000MB | 15000MB | 3500MB | SvPool-1 | VM-2 | HDD-2 |
| SvVVol-3 | 30000MB | 17000MB | 13000MB | 15000MB | SvPool-2 | VM-3 | HDD-3 |
| .. | .. | .. | .. | .. | .. | .. | .. |
| .. | .. | .. | .. | .. | .. | .. | .. |

| LLP IDENTIFIER | END-TO-END CAPACITY LEVERAGE RATIO |
|---|---|
| STPOOL-1 | 500% |
| STPOOL-2 | 150% |
| ⋮ | ⋮ |
| ⋮ | ⋮ |

| END-TO-END CAPACITY LEVERAGE RATIO THRESHOLD VALUE | INFORMATION GATHERING INTERVAL |
|---|---|
| 200% | 3.0h |
| 200% | 3.0h |
| ⋮ | ⋮ |

| LLP IDENTIFIER | LLP CAPACITY | LLP ALLOCATED CAPACITY | VOL IDENTIFIER | LL-VVOL IDENTIFIER | LL-VVOL TOTAL CAPACITY |
|---|---|---|---|---|---|
| STPOOL-1 | 10000MB | 7000MB | STLDEV-1 STLDEV-2 | STVVOL-1 STVVOL-2 | 20000MB |
| STPOOL-2 | 20000MB | 15000MB | STLDEV-3 STLDEV-4 | STVVOL-3 | 30000MB |
| ... | ... | ... | ... | ... | ... |
| 11001 | 11002 | 11003 | 11004 | 11005 | 11006 |

| LL-VVOL IDENTIFIER | LL-VVOL CAPACITY | LL-VVOL ALLOCATED CAPACITY | LLP IDENTIFIER | LLP CAPACITY | PORT NUMBER /LUN |
|---|---|---|---|---|---|
| STVVOL-1 | 10000MB | 3000MB | STPOOL-1 | 10000MB | PORT-XXX.XXX LUN-0 |
| STVVOL-2 | 10000MB | 4000MB | STPOOL-1 | 10000MB | PORT-XXX.XXX LUN-1 |
| STVVOL-3 | 10000MB | 5000MB | STPOOL-2 | 20000MB | PORT-XXX.XYX LUN-1 |
| STVVOL-4 | 20000MB | 10000MB | STPOOL-2 | 20000MB | PORT-XXX.XXX LUN-2 |
| .. | .. | .. | .. | .. | .. |
| .. | .. | .. | .. | .. | .. |

| VOL IDENTIFIER | VOL CAPACITY | PDEV IDENTIFIER | LLP IDENTIFIER |
|---|---|---|---|
| STLDEV-1 | 5000MB | DISK-1, DISK-2, DISK-3 | STPOOL-1 |
| STLDEV-2 | 5000MB | DISK-4, DISK-5 | STPOOL-1 |
| STLDEV-3 | 10000MB | DISK-6, DISK-7, DISK-8 | STPOOL-2 |
| STLDEV-4 | 10000MB | DISK-9, DISK-10 | STPOOL-2 |
| .. | .. | .. | .. |
| .. | .. | .. | .. |

| LLP IDENTIFIER | LL-VVOL IDENTIFIER | VOL IDENTIFIER | DISK APPARATUS IDENTIFIER |
|---|---|---|---|
| STPOOL-1 | STVVOL-1, STVVOL-2 | STLDEV-1, STLDEV-2 | DISK-1, DISK-2, DISK-3, DISK-4, DISK-5 |
| STPOOL-2 | STVVOL-3, STVVOL-4 | STLDEV-3, STLDEV-4 | DISK-6, DISK-7, DISK-8, DISK-9, DISK-10 |
| .. | .. | .. | .. |
| .. | .. | .. | .. |

FIG. 34

| HLP IDENTIFIER | HLP CAPACITY | HLP ALLOCATED CAPACITY | HL-VVOL IDENTIFIER | HL-VVOL TOTAL CAPACITY | CONFIGURATION STORAGE PORT NO. /LUN |
|---|---|---|---|---|---|
| SVPOOL-1 | 20000MB | 10000MB | SVVVOL-1<br>SVVVOL-2 | 50000MB | PORT-XXX.XXX<br>LUN-0 |
| SVPOOL-2 | 20000MB | 17000MB | SVVVOL-3 | 30000MB | PORT-XXX.YYY<br>LUN-1 |
| ... | ... | ... | ... | ... | ... |
| 15001 | 15002 | 15003 | 15004 | 15005 | 15006 |

| HL-VVOL IDENTIFIER | HL-VVOL CAPACITY | HL-VVOL ALLOCATED CAPACITY | HLP IDENTIFIER | HLP CAPACITY | CORRESPONDING VIRTUAL MACHINE IDENTIFIER | DEVICE IDENTIFIER FOR VIRTUAL MACHINE RECOGNITION |
|---|---|---|---|---|---|---|
| SVVVOL-1 | 10000MB | 3000MB | SVPOOL-1 | 10000MB | VM-1 | HDD-1 |
| SVVVOL-2 | 10000MB | 4000MB | SVPOOL-1 | 10000MB | VM-2 | HDD-2 |
| SVVVOL-3 | 10000MB | 5000MB | SVPOOL-2 | 20000MB | VM-3 | HDD-3 |
| SVVVOL-4 | 20000MB | 10000MB | SVPOOL-2 | 20000MB | VM-4 | HDD-4 |
| .. | .. | .. | .. | .. | .. | .. |
| 16001 | 16002 | 16003 | 16004 | 16005 | 16006 | 16007 |

| | LLP CAPACITY | HL-VVOL TOTAL CAPACITY | END-TO-END CAPACITY LEVERAGE RATIO | FREE CAPACITY RATIO |
|---|---|---|---|---|
| LLP1 | 500TB | 2000TB | 400% | 15% |
| HLP1 | 800TB | 1600TB | | 50% |
| HLP2 | 100TB | 400TB | | 8% |

COMPUTER SYSTEM PERFORMING CAPACITY VIRTUALIZATION BASED ON THIN PROVISIONING TECHNOLOGY IN BOTH STORAGE SYSTEM AND SERVER COMPUTER

CROSS-REFERENCE TO PRIOR APPLICATION

This application relates to and claims the benefit of priority from Japanese Patent Application number 2009-210763, filed on Sep. 11, 2009 the entire disclosure of which is incorporated herein by reference.

BACKGROUND

The present invention generally relates to management of a computer system which includes a storage system and a server computer.

Storage capacity virtualization technology called "Thin provisioning technology" is known. Thin provisioning technology is disclosed in Japanese Patent Application Laid-open No. 2006-338341.

SUMMARY

A computer system can be conceived which implements storage virtualization in accordance with thin provisioning technology in both a storage system and a server computer which accesses the storage system. One issue is the management of a computer system of this kind.

Therefore, an object of the present invention is to facilitate management of a computer system in which storage virtualization is carried out in accordance with thin provisioning technology in both a storage system and a server computer.

A management system for managing a storage system and a server computer is provided. The management system identifies a server level virtual volume corresponding to a storage level pool on the basis of storage management information and server management information, and displays information relating to the correspondence between the storage level pool and the server level virtual volume. The storage management information represents correspondence between a storage level virtual volume to which a portion of an area is allocated from the storage level pool by thin provisioning technology at a storage level, and the storage level pool. The server management information represents correspondence between a server level virtual volume to which a portion of an area is allocated from the storage level virtual volume belonging to a server level pool by thin provisioning technology at a server level, and the storage level virtual volume.

According to the present invention, it is possible to facilitate management of a computer system in which storage virtualization is carried out in accordance with thin provisioning technology in both a storage system and a server computer.

BRIEF DESCRIPTION OF THE DRAWINGS

FIG. 6 is a block diagram showing storage level pool configuration information 1400;

FIG. 7 is a block diagram showing storage level virtual volume configuration information 1500;

FIG. 8 is a block diagram showing port/LUN correspondence information 1600;

FIG. 9 is a block diagram showing server level pool configuration information 1700;

FIG. 10 is a block diagram showing storage level virtual volume configuration information 1800;

FIG. 11 is a block diagram showing the end-to-end capacity leverage rate information 1900;

FIG. 12 is a block diagram showing initial settings information 1910;

FIG. 30 is a block diagram showing storage level pool information 11000;

FIG. 31 is a block diagram showing storage level virtual volume information 12000;

FIG. 32 is a block diagram showing volume information 13000;

FIG. 33 is a block diagram showing storage internal mapping information 14000;

FIG. 34 is a block diagram showing server level pool information 15000;

FIG. 35 is a block diagram showing server level virtual volume information 16000;

FIG. 38 shows one example of a screen where the end-to-end capacity leverage ratio and the free capacity ratio are displayed side by side.

DETAILED DESCRIPTION OF THE EMBODIMENT

Figure 1:
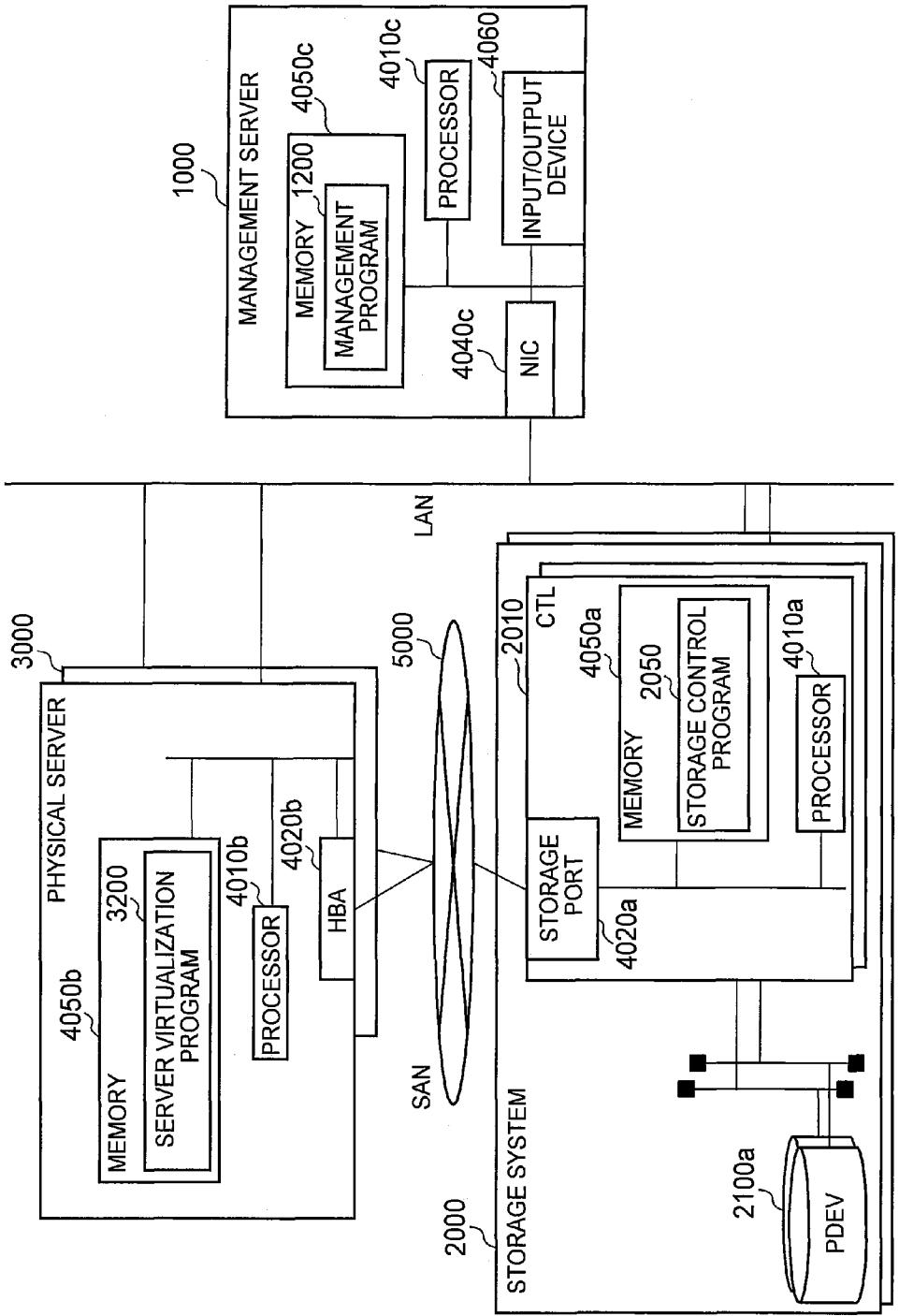
FIG. 1 is a diagram showing the configuration of a computer system according to a first embodiment of the present invention.

Below, embodiments of the present invention are described with respect to the accompanying drawings. The definitions of the terms used in the description of the embodiments are as indicated below. For other terms, generic definitions can be applied. Furthermore, in the following description, processes executed by a computer program are actually carried out by a processor which executes the computer program.

"Leverage ratio" is the ratio of the capacity of a virtual storage area corresponding to a physical storage area, with respect to the capacity of the physical storage area. In the present embodiment, there are leverage ratios of a plurality of types. For example, the leverage ratio of a first type is the ratio of the total capacity of one or more server level pools corresponding to a storage level pool, with respect to the capacity of the storage level pool. The leverage ratio of a second type is the ratio of the total capacity of one or more server level virtual volumes corresponding to a storage level pool, with respect to the capacity of the storage level pool. In the following description, the second type of leverage ratio, in particular, is called "end-to-end capacity leverage ratio".

"Volume" means a logical storage area (logical volume) which is provided on the basis of one or more physical storage devices (for example, a hard disk drive or flash memory). A volume is provided on the basis of a storage space of a RAID (Redundant Array of Independent (or Inexpensive) Disks) group, for example. The RAID group contains a plurality of physical storage devices, and data is stored in accordance with prescribed RAID levels.

"Storage level virtual volume" is a virtual volume which is provided by the storage controller. The whole of the area (storage area) of the storage level virtual volume does not necessarily have to be allocated to a physical storage area. More specifically, for instance, all or a portion of the area of the storage level virtual volume is not initially allocated with the area in one or more volumes belonging to a storage level pool. In other words, initially, for example, a portion of the area of a storage level pool may be allocated to an area of a portion of the storage level virtual volume. Here, "initially" means, for example, immediately after a storage level virtual volume has been defined, or immediately after a storage level virtual volume has been defined and has become accessible from a physical server. The storage system sends the capacity of the storage level virtual volume to the physical server on the basis of storage level virtual volume information which represents the capacity of the storage level virtual volume. The data format, such as the data structure, may differ, and may be different due to rounding down, or the like, between the capacity of the storage level virtual volume which is managed internally in the storage system and the capacity of the storage level virtual volume which is sent to the physical server by SCSI protocol, or the like. Of course, the capacity of the storage level virtual volume which is managed inside the storage system and the capacity of the storage level virtual volume which is sent to the physical server may be the same.

"Server virtualization program" is a program which constructs a virtual server system by virtualizing the physical resources of a physical server. The server virtualization program is, for example, a hypervisor. Furthermore, the physical resources are, for example, a processor (for instance, a microprocessor), a storage resource (for instance, a memory), and a communications interface apparatus (for instance, an HBA (Host Bus Adapter)).

A "virtual machine" is a virtual computer which is provided by a server virtualization program. By means of a server virtualization program, it is possible to construct a system in such a manner that a plurality of computers operate effectively on a single physical server. Each of these effective computers is a virtual machine. In a virtual machine, for example, a computer program, such as an OS (Operating System), or the like, is carried out virtually.

"Server level pool" is a storage area constructed from one or more storage level virtual volumes allocated from the storage system by the server virtualization. The server level pool is used from a virtual machine via a server level virtual volume. More specifically, if data is being written from a virtual machine to a server level virtual volume, the area of a portion of the server level pool (an area of a portion of the server level virtual volume) is allocated as the write destination area for that data. Thereupon, a write request indicating an area inside the storage level virtual volume which corresponds to the area of the allocated portion is sent to the storage system that provides that storage level virtual volume, from the physical server (for example, from the server virtualization program executed on the physical server). In response to this write request, the storage controller of the storage system allocates a portion of the area inside the storage level pool to the area indicated in the write request (the area inside the storage level virtual volume), and writes data to the allocated area. In concrete terms, the data is written to a physical storage area (an area within a physical storage device) which forms the basis of the allocated area (an area within the storage level pool).

"Server level virtual volume" is a virtual volume which is constructed by a server virtualization program. The whole of the storage area of the storage level virtual volume does not necessarily have to be allocated to a physical storage area. The storage area of the server level virtual volume is accessed by a virtual machine.

"Storage level pool" is a pool made up of one or more volumes. The area of one portion of the storage level pool is allocated as a write destination area from the physical server, in the storage level virtual volume. The storage level pool may be a group (a virtual pool) of a plurality of pools belonging to one or more volumes.

Figure 36:
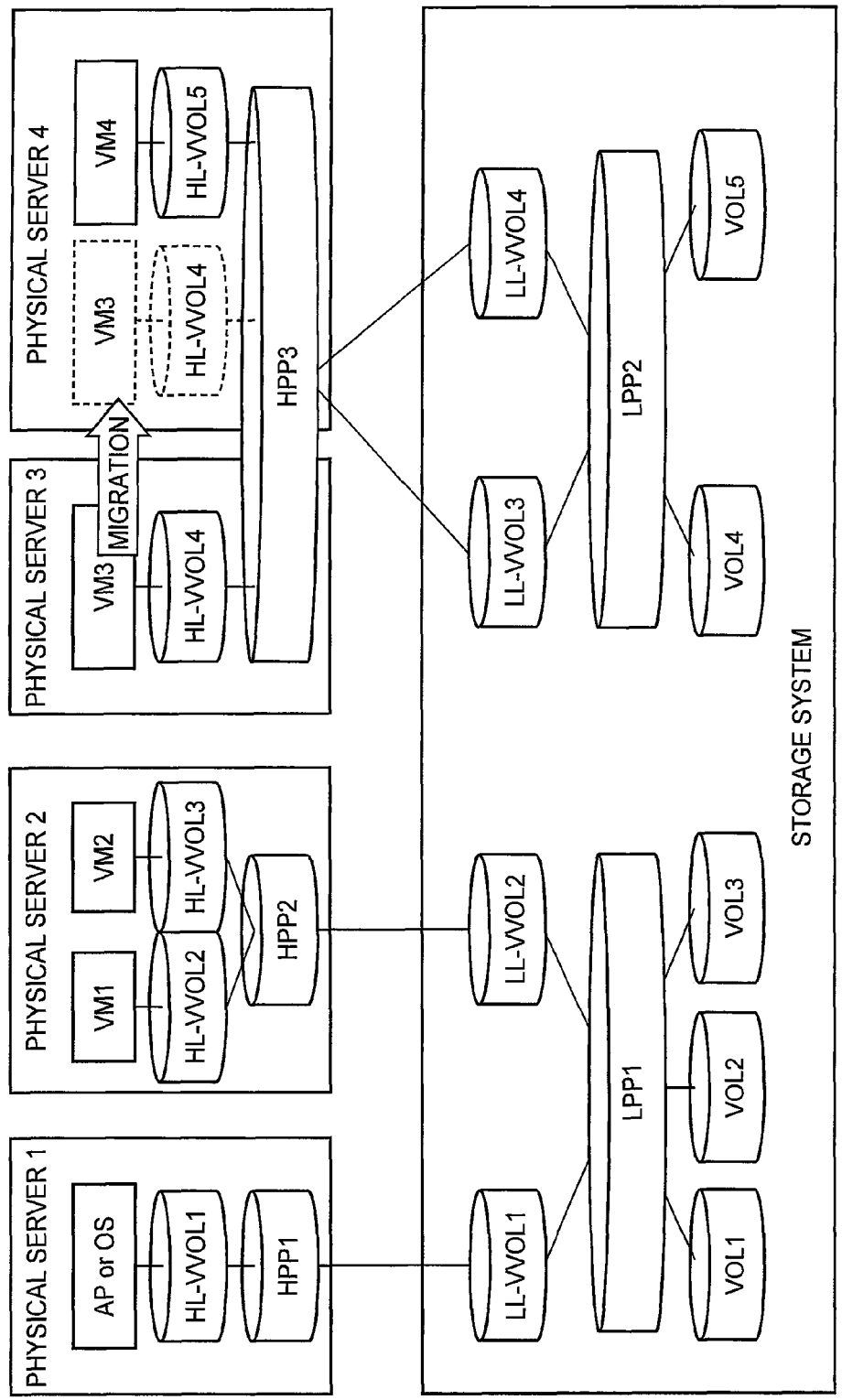
FIG. 36 shows one example of a hierarchy relationship of storage areas.

FIG. 36 shows one example of a hierarchy relationship of storage areas. In FIG. 36, a virtual machine is represented as "VM", a volume is represented as "VOL", a storage level pool is represented as "LLP" which is an abbreviation of "low-level pool", a storage level virtual volume is represented as "LL-VVOL" which is an abbreviation of "low-level virtual volume", a server level pool is represented as "HLP" which is an abbreviation of "high-level pool", and a server level virtual volume is represented as "HL-VVOL" which is an abbreviation of "high-level virtual volume". This method of representation is also employed as appropriate in the other drawings.

According to this example, there are a plurality of storage level pools (for example, storage level pools 1, 2), and a storage area topology having a tree structure is constructed on the basis of these respective storage level pools. The constituent elements of the storage area topology are, stated in order from the lower level, storage level pools, storage level virtual volumes, server level pools and server level virtual volumes. According to this example, the following storage areas (A) to (D) correspond to the storage level pool 1:

(A) storage level virtual volume 1 and 2;

(B) server level pools 1 and 2 which correspond respectively to the storage level virtual volumes 1 and 2;

(C) server level virtual volume 1 which corresponds to server level pool 1 (server level virtual volume 1 to which a portion of storage area is allocated from the server level pool 1); and (D) server level virtual volumes 2 and 3 which correspond to the server level pool 2.

In other words, according to this example, the server level virtual volumes 1 to 3 correspond to the storage level pool 1, these server level virtual volumes 1 to 3 being constituent elements of the storage area topology based on the storage level pool 1.

In the embodiment described below, it is possible to calculate the end-to-end capacity leverage ratio for each storage area topology, in other words, for each storage level pool. This is because, for each storage level pool, it is possible to identify the storage area topology forming the basis of that storage level pool, in other words, to identify the corresponding server level virtual volumes.

As shown in FIG. 36, the subject which accesses a server level virtual volume may or may not be a virtual machine. For example, an application program (AP) or OS may access a server level virtual volume, as indicated in the physical server 1. In this case, for example, the application program or OS may allocate a portion of the area inside the server level pool as a write destination area of the server level virtual volume, and may issue a write request specifying the area (an area within a storage level virtual volume) which corresponds to the partial area of the server level pool, to the storage system.

Furthermore, as shown in FIG. 36, a server level pool may share a plurality of physical servers, for example, physical servers 3 and 4. In this case, even if a virtual machine 3 in the physical server 3 is migrated to the physical server 4 as indicated by the dotted line, for example, the end-to-end capacity leverage ratio of the storage level pool 2 does not change. This is because the migration of the virtual machine 3 means that the server level virtual volume 4 which was mounted on the virtual machine 3 is also migrated to the physical server 4, but no actual change occurs in the capacity of that server level virtual volume 4. In other words, the end-to-end capacity leverage ratio of the storage level pool 2 changes in cases where a configuration change which alters the total capacity of the server level virtual volumes 4 and 5 corresponding to the storage level pool 2 (or a configuration change which alters the capacity of the storage level pool 2) has been carried out.

A server level virtual volume may be formed by a plurality of areas of a prescribed size (hereinafter, called "HL virtual pages"). A server level pool may be formed by a plurality of areas of a prescribed size (hereinafter, called "HL actual pages"). A storage level virtual volume may be formed by a plurality of areas of a prescribed size (hereinafter, called "LL virtual pages"). A storage level pool may be formed by a plurality of areas of a prescribed size (hereinafter, called "LL actual pages"). In this composition, one or more HL actual pages correspond to one or more LL virtual pages. For example, HL actual pages and LL virtual pages may correspond to each other on a one-to-one fashion. The correspondences between pages may be managed by means of a table, or the like, or may be determined by calculation.

If a write request stating a certain HL virtual page in a server level virtual volume has been issued, then if an HL actual page has not yet been allocated to that HL virtual page, a free HL actual page is allocated from the server level pool corresponding to that server level virtual volume. A write request stating a LL virtual page corresponding to the allocated HL actual page is sent from the physical server 3000 to the storage system 2000. In the storage system 2000, if an LL actual page has not yet been allocated to that LL virtual page, then a free LL actual page is allocated to the LL virtual page from the storage level pool corresponding to the storage level virtual volume containing the LL virtual page. Data corresponding to the write request is then written to that LL actual page. If the LL actual page is based on a plurality of PDEVs, for example, then data is stored in the plurality of PDEVs in accordance with a prescribed RAID level, for example.

FIRST EMBODIMENT

In the first embodiment, a management server gathers virtual volume information for the storage system and virtual volume information for the physical servers, analyzes the virtual volume information of the storage system and the virtual volume information of the physical server, and indicates the end-to-end capacity leverage ratio to the administrator (for example, storage administrator) on the basis of these analysis results. The details of this are described below.

<1. Configuration of Computer System>

FIG. 1 is a diagram showing the configuration of a computer system according to a first embodiment of the present invention.

The computer system comprises a storage system 2000, a physical server 3000 and a management server 1000. At least one of the storage system 2000, the physical server 3000 and the management server 1000 may be provided in plural fashion.

The storage system 2000 and the physical server 3000 are mutually connected via a communications network, for example, a SAN 5000 or a LAN 5010. The management server 1000 connects the storage system 2000 and the physical server 3000 via a communications network, for example, a LAN 5010 or a SAN 5000.

<1-1. Configuration of Storage System>

The storage system 2000 comprises a plurality of PDEVs (physical storage devices) 2100*a* and a plurality of storage controllers (CTL) 2010. The PDEVs 2100*a* and the storage controllers 2010 are connected to each other by means of an internal network or bus, for example. The storage controller 2010 stores data in a storage area on the basis of the PDEVs 2100*a*.

The PDEVs 2100*a* are disk type storage media drives (for example, hard disk drives) and store data in accordance with write requests received by the storage system 2000 from the physical server 3000. The PDEVs 2100*a* may also be flash memory drives, for instance. It is also possible to provide one PDEV 2100*a* only.

The storage controller 2010 is an apparatus which controls the operation of the storage system 2000. The storage controller 2010 comprises an internal network. The internal network is connected, for example, to a storage port 4020*a*, a processor 4010*a* (for example, CPU) and a memory 4050*a*. Storage controllers 2010 are connected to each other via the internal network. Furthermore, the storage controllers 2010 and respective PDEVs 2100*a* are connected to each other by a plurality of back-end networks. It is also possible to provide one storage controller 2010 only.

The storage port 4020a is an interface which is connected to the storage system 2000 and the management server 1000 via a network, such as a SAN 5000.

The processor 4010a carries out processing of various types by executing a program stored in the memory 4050a.

The memory 4050a is formed by a RAM (Random Access Memory), for example, and stores programs to be executed by the processor 4010a and information required by the processor 4010a, and the like. More specifically, for example, a storage control program 2500 is stored in the memory 4050a of the storage controller 2010, and controls the storage controller 2010 on the basis of management operation requests received from the management server 1000. A management operation request is a request for operating the storage system 2000, for example, a volume construction request, storage level pool construction request, or the like. The memory 4050a may be employed as a cache memory in which data input to or output from the PDEVs 2100a is stored temporarily.

The internal networks in the physical server 3000 and the storage system 2000 desirably have broader bandwidth than the transmission bandwidth of the storage port 4020a, and all or a portion thereof may be substituted by bus or switch type networks. Furthermore, in FIG. 1, one storage port 4020a is present in the storage controller 2010, but in actual practice, a plurality of storage ports 4020a may be present in the storage controller 2010. The storage controller 2010 may be formed by a plurality of components. Similarly, the memory 4050a may also be formed by a plurality of components.

As described below, the storage system 2000 forms one or more volumes which belong to a storage level pool, for example. The storage level pool may belong to the storage system 2000, or may belong to a system other than the storage system 2000 (for example, a system interposed between the storage system 2000 and the physical server 3000 (for instance, a switching apparatus)).

A storage system may be one storage apparatus, or a group of a plurality of storage apparatuses. For example, a volume (VOL) managed by a certain storage apparatus may be a VOL based on a PDEV contained in another storage apparatus.

The whole area of one or more volumes may have been allocated to the area of a storage device included in a storage system, or a portion of the area of one or more volumes may not have been allocated to the area of the storage device.

<1-2. Configuration of Physical Server>

The physical server 3000 is one example of a server computer, and comprises a processor 4010b, a memory 4050b and an HBA 4020b. The processor 4010b, the memory 4050b and the HBA 4020b are connected to each other via an internal network.

The processor 4010b carries out processing of various types by executing a program stored in the memory 4050b. For example, the processor 4010b can input or output (write or read) data to or from one or more storage level virtual volumes 2230 provided by the storage system 2000, by sending an I/O request (write request or read request) to the storage system 2000.

The memory 4050b stores programs which are executed by the processor 4010b and information required by the processor 4010b, and the like. The memory 4010b may be a semiconductor memory or storage device, or a combination of these. The memory 4050b stores a server virtualization program 3200.

The HBA 4020b is an interface which is connected to the storage system 2000 via a network, such as a SAN 5000, LAN 5010, or the like. More specifically, for example, the HBA 4020b outputs I/O requests from the processor 4010b to the storage system 2000.

The server virtualization program 3200 constructs a virtual server environment (virtual machine) from the physical resources belonging to the physical server 3000.

<1-3. Configuration of Management Server>

The management server 1000 is a computer which comprises a processor 4010c, a memory 4050c, a management program 1200, and a NIC (Network Interface Card) 4040c. The processor 4010c, the memory 4050c, the PDEV 2100c and the NIC 4040c are connected to each other via an internal network.

The processor 4010c carries out processing of various types by executing a program stored in the memory 4050c. For example, the processor 4010c controls the allocation of storage level virtual volumes 2230 to the physical server 3000 as executed by the storage system 2000, by sending a management request to the storage system 2000. The management request may include a remote transfer request or a copy control request, or the like.

The memory 4050c stores programs which are executed by the processor 4010c and information required by the processor 4010c, and the like. For example, a management program 1200 is stored in the memory 4050c. The memory 4050c may be a semiconductor memory or storage device, or a combination of these.

The NIC 4040c is an interface which is connected to the storage system 2000 via a network, such as a LAN 5010, or the like.

The management server 1000 may comprise an input/output device 4060. The input/output device 4060 inside the management server 1000 is also connected to the internal network.

Examples of an input/output device 4060 are a display, a keyboard and a pointer device, but devices other than these may also be used. Furthermore, as an alternative to an input/output device 4060, a serial interface or Ethernet interface may be used as an input/output device 4060. Moreover, a display computer comprising a display, keyboard or pointer device may also be connected to this interface. Display information may be sent to a display computer and input information may be received from a display computer. By this means, a display can be provided on the display computer and by receiving an input, an input operation to the input/output device 4060 can be performed.

The management program 1200 manages the storage system 2000. More specifically, for example, the management program 1200 performs operations, such as managing the volume configuration, managing the storage level pool configuration, managing the storage level virtual volume configuration, instructing volume allocations of various types, and so on.

The management server 1000 may be divided into a device which manages the storage system 2000 and a device which manages the physical servers 3000. More specifically, for instance, the management server 1000 is one example of a management system. The management system comprises one or more computers, for example, a management computer, or a combination of a management computer and a display computer. More specifically, if the management computer shows display information, for example, then the management computer forms a management system. Furthermore, in order to increase the speed and reliability of processing, it is also possible to achieve functions similar to those of the management computer by means of a plurality of computers, and in this case, the plurality of computers (also including a display computer if display is performed by a display computer) form a management system.

<2. Details of Storage>

Figure 28:
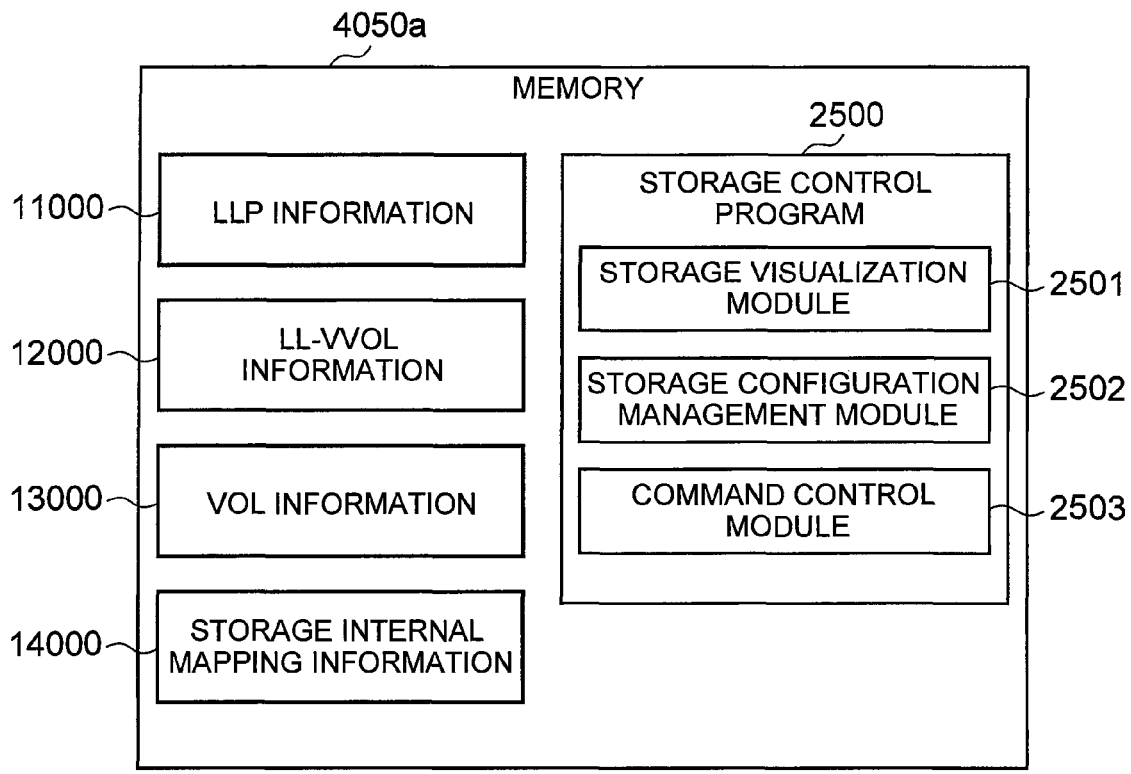
FIG. 28 is a diagram showing the details of information and programs stored in the memory 4050a of the storage controller 2010.

FIG. 28 is a diagram showing the details of information and programs stored in the memory 4050a of the storage controller 2010.

The memory 4050a stores, for example: storage level pool information 11000, storage level virtual volume information 12000, volume information 13000, storage internal mapping information 14000 and a storage control program 2500.

The storage level pool information 11000 is information relating to storage level pools.

The storage level virtual volume information 12000 is information relating to storage level virtual volumes.

The volume information 13000 is information relating to volumes.

The storage internal mapping information 14000 is information which indicates the mapping of storage areas of various types (volumes, storage level pools, storage level virtual volumes) which are managed by the storage system 2000.

The storage control program 2500 is a program in which processing relating to the control of the storage system 2000 is defined. The storage control program 2500 comprises, for example, a storage virtualization module 2501, a storage configuration management module 2502 and a command control module 2503. The respective modules included in the storage control program 2500 do not necessarily have to be modules of a single program, and may respectively be separate program codes.

<2-1. Description of Information Belonging to Storage System>

<2-1-1. Description of Storage Level Pool Information>

FIG. 30 is a block diagram showing storage level pool information 11000.

The storage level pool information 11000 includes, for example, for each storage level pool, information relating to the storage level pool, as well as information relating to the volumes belonging to the storage level pool and information relating to the storage level virtual volumes to which storage area is allocated from the storage level pool. More specifically, for example, the storage level pool information 11000 is a table, which contains, for each storage level pool, a record of the following attribute values: a storage level pool identifier 11001, a storage level pool capacity 11002, a storage level pool allocated capacity 11003, volume identifiers 11004, storage level virtual volume identifiers 11005 and a storage level virtual volume total capacity 11006.

The storage level pool identifier 11001 is an identifier which is allocated to the storage level pool 2220 by the storage virtualization module 2501.

The storage level pool capacity 11002 is the capacity of the storage level pool.

The storage level pool allocated capacity 11003 is the total capacity of the area, out of the capacity of the storage level pool, which has been allocated to storage level virtual volumes 2230 by the storage control program 2500.

The volume identifiers 11004 are identifiers of volumes belonging to the storage level pool. A volume belonging to the storage level pool means a volume which has been set so as to belong to the storage level pool by the storage virtualization module 2501.

The storage level virtual volume total capacity 11006 is the sum value of the capacities of all of the storage level virtual volumes corresponding to the storage level pool.

Provided that the storage level pool information 11000 contains attribute values relating to a storage level pool, a data structure other than a table may be employed, and attribute values relating to a storage level pool other than the attribute values described above may also be included. Furthermore, the storage level pool information 11000 may omit a portion of the attribute values described above, apart from the storage level pool identifier.

Furthermore, as can be seen from FIG. 30, the storage level pool capacity 11002 is not necessarily the same as the storage level virtual volume total capacity 11006. This is because the storage level pool may be formed by an area of a portion of one or more volumes belonging to the storage level pool.

<2-1-2. Storage Level Virtual Volume Information>

FIG. 31 is a block diagram showing storage level virtual volume information 12000.

The storage level virtual volume information 12000 includes, for each storage level virtual volume: information relating to the storage level virtual volume, and information relating to the storage level pool which is the allocation source of the area allocated to that storage level virtual volume. More specifically, for example, the storage level virtual volume information 12000 is a table which contains, for each storage level virtual volume, a record of the following attribute values: a storage level virtual volume identifier 12001, a storage level virtual volume capacity 12002, a storage level virtual volume allocated capacity 12003, a storage level pool identifier 12004, a storage level pool capacity 12005 and a port number/LUN (Logical Unit Number) 12006.

The storage level virtual volume identifier 12001 is an identifier which is allocated to the storage level virtual volume by the storage virtualization module 2501.

The storage level virtual volume capacity 12002 is the capacity of the storage level virtual volume set by the storage virtualization module 2501.

The storage level virtual volume allocated capacity 12003 is the total capacity of the area, out of the storage level virtual volume capacity 1502, which has been allocated to the storage level virtual volume from the storage level pool by the storage control program 2500.

The storage level pool identifier 12004 is an identifier of the storage level pool 2220 which is the allocation source of the area allocated to the storage level virtual volume.

The storage level pool capacity 12005 is the capacity of the storage level pool.

The port number/LUN 12006 is the port number and LUN corresponding to the storage level virtual volume.

Provided that the storage level virtual volume information 12000 contains attribute values relating to a storage level virtual volume, a data structure other than a table may be employed, and attribute values relating to a storage level virtual volume other than the attribute values described above may also be included. Furthermore, the storage level virtual volume information 12000 may omit a portion of the attribute values described above, apart from the storage level virtual volume identifier 12001.

<2-1-3. Volume Information>

FIG. 32 is a block diagram showing volume information 13000.

The volume information 13000 contains, for each volume, information relating to a volume and information on the storage level pool to which the volume belongs. More specifically, for example, the volume information 13000 is a table which contains, for each volume, a record of the following attribute values: a volume identifier 13001, a volume capacity 13002, PDEV identifiers 13003, and a storage level pool identifier 13004.

The volume identifier 13001 is an identifier which is allocated to the volume by the storage virtualization module 2501.

The volume capacity 13002 is the capacity of the volume. A volume is constructed, for example, by the storage virtualization module 2501 grouping together the storage area of one of more PDEVs 2100a. The storage area of the volume is mapped and distributed to the storage area of one or more PDEVs 2100a under control implemented by the storage controller 4050.

The PDEV identifier 13003 is an identifier that has been allocated to a PDEV 2100a based on the volume by the storage virtualization module 2501. In other words, the PDEV identifiers 13003 are the identifiers of the PDEVs 2100a which form the basis of the volume.

The storage level pool identifier 13004 is an identifier of the storage level pool to which the volume belongs.

Provided that the volume information 13000 contains attribute values relating to a volume, a data structure other than a table may be employed, and attribute values relating to a volume other than the attribute values described above may also be included. Furthermore, the volume information 13000 may omit a portion of the attribute values described above, apart from the volume identifier 13001.

<2-1-4. Storage Internal Mapping Information>

FIG. 33 is a block diagram showing storage internal mapping information 14000.

The storage internal mapping information 14000 is, for example, a table which contains, for each storage level pool, a record of the following attribute values: a storage level pool identifier 14001, storage level virtual volume identifiers 14002, volume identifiers 14003, and PDEV identifiers 14004.

The storage level pool capacity 14001 is an identifier of the storage level pool.

The storage level virtual volume identifiers 14002 are identifiers of the storage level virtual volumes to which a portion of storage area is allocated from the storage level pool.

The volume identifiers 14003 are identifiers of volumes belonging to the storage level pool.

The PDEV identifiers 14004 are identifiers of the PDEVs 2100a which form the basis of the volumes belonging to the storage level pool.

Provided that the storage internal mapping information 14000 contains attribute values relating to mapping of the devices included in the storage system 2000, a data structure other than a table may be employed, and attribute values relating to mapping information other than the attribute values described above may also be included. Furthermore, the storage internal mapping information 14000 may omit a portion of the attribute values described above, apart from the storage level pool identifier 14001.

<2-2. Description of Program Belonging to Storage System>

Figure 3:
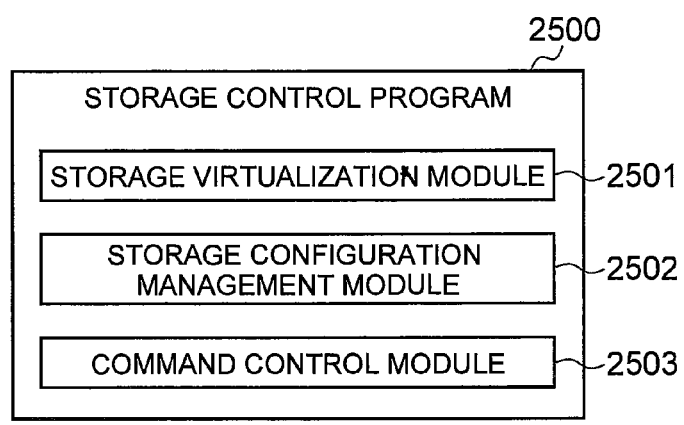
FIG. 3 is a diagram showing the configuration of a storage control program 2500.

FIG. 3 is a diagram showing the configuration of a storage control program 2500.

As shown in FIG. 28 as well, the storage control program 2500 comprises, for example, a storage virtualization module 2501, a storage configuration management module 2502 and a command control module 2503. A process for controlling the storage system 2000 is written in the storage control program 2500, which is stored in the memory of the storage controller 2010 and executed.

The storage configuration management module 2502 manages the configuration of the storage areas of various types included in the storage system 2000. In specific terms, the management of the configuration of the storage area means, for example, management of the volumes which make up the storage level pools, management of the PDEVs 2100a which make up the volumes, and so on.

The command control module 2503 interprets a command (for example, an I/O request) from a physical server 3000 or management server 1000, and executes processing as stipulated by that command.

The storage virtualization module 2501 constructs volumes on the basis of PDEVs 2100a. The storage virtualization module 2501 also constructs storage level virtual volumes. The storage virtualization module 2501 maps one or more volumes and one or more storage level virtual modules to a storage level pool.

<3. Details of Physical Server>

Figure 29:
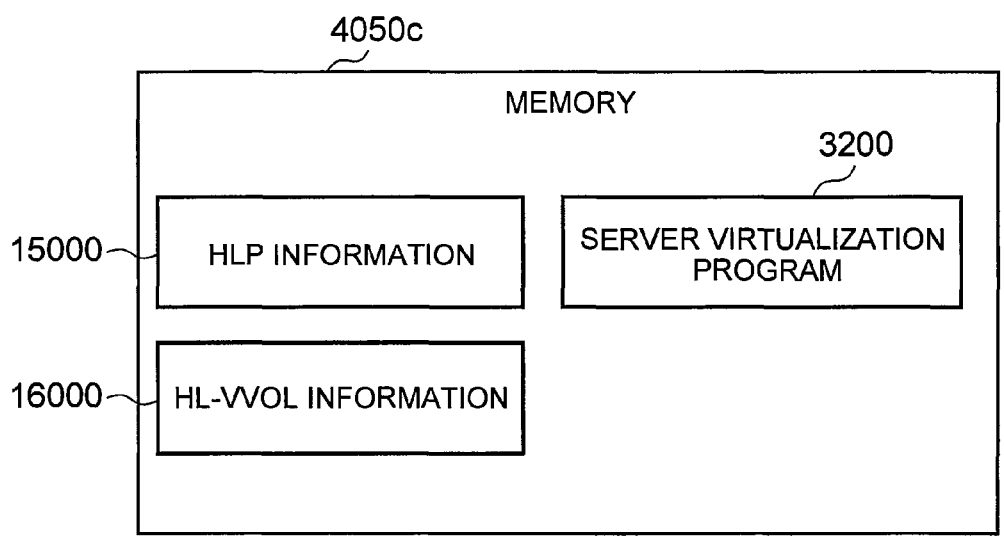
FIG. 29 is a diagram showing the details of information and programs stored in the memory 4050b of a physical server 3000.

FIG. 29 is a diagram showing the details of information and programs stored in the memory 4050b of a physical server 3000.

The memory 4050b stores server level pool information 15000, server level virtual volume information 16000 and a server virtualization program 3200.

The server level pool information 15000 is information relating to a server level pool.

The server level virtual volume information 16000 is information relating to server level virtual volumes.

The server virtualization program 3200 constructs virtual machines 3201, a server level pool 3210, server level virtual volumes 3220, and the like, using the resources of a physical server 3000.

<3-1. Description of Information Belonging to Physical Server>

<3-1-1. Server Level Pool Information>

FIG. 34 is a block diagram showing server level pool information 15000.

The server level pool information 15000 includes, for example, for each server level pool, information relating to the server level pool, as well as information relating to the storage level virtual volumes belonging to the server level pool, and information relating to the server level virtual volumes to which storage area is allocated form the server level pool. More specifically, for example, the server level pool information 15000 is a table which contains, for each server level pool, a record of the following attribute values: a server level pool identifier 15001, a server level pool capacity 15002, a server level pool allocated capacity 15003, server level virtual volume identifiers 15004, a server level virtual volume total capacity 15005, and a configuration storage port number/LUN (Logical Unit Number) 15006.

The server level pool identifier 15001 is an identifier which has been allocated to the server level pool 3210 by the server virtualization module 3200.

The server level pool capacity 15002 is the capacity of the server level pool 3210.

The server level pool allocated capacity 15003 is the total capacity of the area, out of the server level pool capacity 15002, which has been allocated to server level virtual volumes 3220.

The server level virtual volume identifiers 15004 are identifiers of the server level virtual volumes to which a portion of storage area is allocated from the server level pool.

The server level virtual volume total capacity 15005 is the sum total of the capacities of all of the server level virtual volumes to which storage area is allocated from the server level pool.

The configuration storage port number/LUN 15006 is the LUN and port number for identifying a storage level virtual volume belonging to the server level pool (the LUN and port number are used in I/O requests as a parameter indicating a storage level virtual volume).

Provided that the server level pool information 15000 contains attribute values relating to a server level pool, data structure other than a table may be employed, and attribute values relating to the server level pool configuration other than the attribute values described above may also be included. Furthermore, the server level pool information 15000 may omit a portion of the attribute values described above, apart from the server level pool identifier 15001.

<3-1-2. Server Level Virtual Volume Information>

FIG. 35 is a block diagram showing server level virtual volume information 16000.

The server level virtual volume information 16000 includes, for example, for each server level virtual volume, information relating to the server level virtual volume, as well as information relating to the server level pool which is the allocation source of the area allocated to the server level virtual volume, and information relating to virtual machine which uses the server level virtual volume. More specifically, for example, the server level virtual volume information 16000 contains, for each server level virtual volume, a record of the following attribute values: a server level virtual volume identifier 16001, a server level virtual volume capacity 16002, a server level virtual volume allocated capacity 16003, a server level pool identifier 16004, a server level pool capacity 16005, a corresponding virtual machine identifier 16006 and a device identifier for virtual machine recognition 16007.

The server level virtual volume identifier 16001 is an identifier which has been allocated to the server level virtual volume by the server virtualization program 3200.

The server level virtual volume capacity 16002 is the capacity of the server level virtual volume.

The server level virtual volume allocated capacity 16003 is the total capacity of the area (virtual area), out of the server level virtual volume capacity, to which storage area has been allocated from the server level pool.

The server level pool identifier 16004 is an identifier of the server level pool which is the allocation source of the area allocated to the server level virtual volume.

The server level pool capacity 16005 is the capacity of the server level pool which is the allocation source of the area allocated to the server level virtual volume.

The corresponding virtual machine identifier 16006 is the identifier of the virtual machine which uses the server level virtual volume.

The device identifier for virtual machine recognition 16007 is an identifier whereby the virtual machine 3201 recognizes the server level virtual volume (a device identifier which indicates the server level virtual volume).

Provided that the server level virtual volume information 16000 contains attribute values relating to a server level virtual volume 3220, a data structure other than a table may be employed, and attribute values relating to a server level virtual volume 3220 other than the attribute values described above may also be included. Furthermore, the server level pool information 16000 may omit a portion of the attribute values described above, apart from the server level virtual volume identifier 16001.

<3-2. Description of Program Belonging to Physical Server>

The server virtualization program 3200 is now described.

The server virtualization program 3200 constructs virtual machines 3201, a server level pool 3210, server level virtual volumes 3220, and the like, using the resources of a physical server 3000. A more detailed description of the processing carried out by the server virtualization program 3200 is given in the section <5-1. Thin provisioning in server> below.

<4. Details of Management Server>

Figure 2:
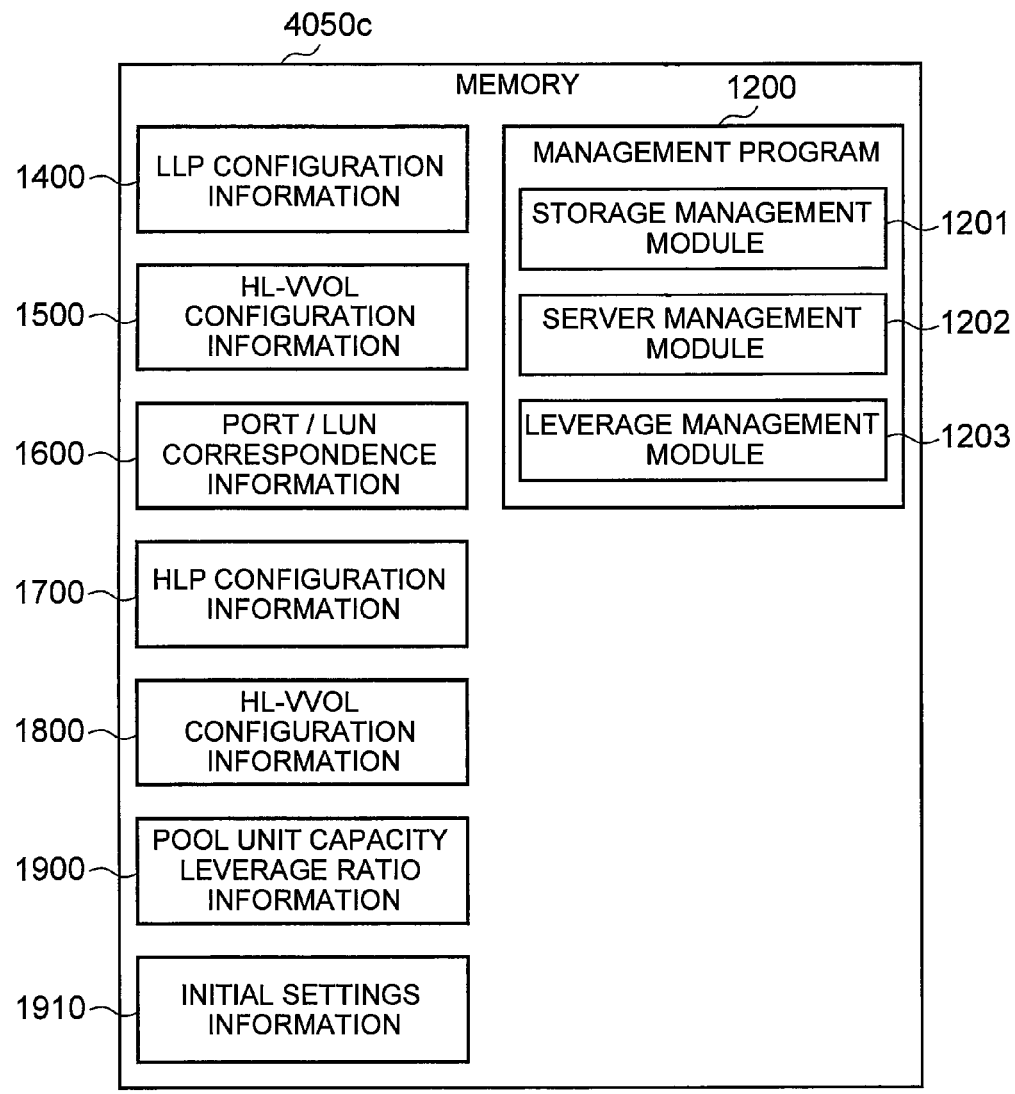
FIG. 2 is a diagram showing the details of information and programs stored in the memory 4050c of a management server 1000.

FIG. 2 is a diagram showing the details of information and programs stored in the memory 4050c of the management server 1000.

The memory 4050c stores: storage level pool configuration information 1400, storage level virtual volume configuration information 1500, port/LUN correspondence information 1600, server level pool configuration information 1700, server level virtual volume configuration information 1800, end-to-end capacity leverage ratio information 1900, initial settings information 1910 and a management program 1200.

The storage level pool configuration information 1400 is information relating to the configuration of storage level pools. Details of the storage level pool configuration information 1400 are given in <4-1. Storage information>.

The storage level virtual volume configuration information 1500 is information relating to the configuration of the storage level virtual volumes. Details of the storage level virtual volume configuration information 1500 are given in <4-1. Storage information>.

The port/LUN correspondence information 1600 is information relating to the port numbers and LUNs corresponding to the storage level virtual volumes which are provided by the storage system 2000 to the physical server 3000. The port/LUN correspondence information 1600 is described in detail in <4-1-3. Management server settings information>.

The server level pool configuration information 1700 is information relating to the configuration of server level pools 3210. Details of the server level pool configuration information 1700 are given in <4-1-2. Physical server information>.

The server level virtual volume configuration information 1800 is information relating to the configuration of the server level virtual volumes. Details of the storage level virtual volume configuration information 1800 are given in <4-1-1. Server information>.

The end-to-end capacity leverage ratio information 1900 is information relating to the end-to-end capacity leverage ratios of the storage level pools. The end-to-end capacity leverage ratio information 1900 is described in detail in <4-1-3. Management server management information>.

The initial settings information 1910 is information relating to the initial settings input by a storage administrator. The initial settings information 1910 is described in <4-1-3. Management server management information>.

The management program 1200 is a program which manages a storage system 2000 and physical servers 3000. The management program 1200 contains a storage management module 1201, a server management module 1202 and a leverage management module 1203.

The storage management module 1201 is a module which manages a storage system 2000 by using the storage level pool configuration information 1400 and the storage level virtual volume configuration information 1500.

The server management module 1202 is a module which manages a physical server 3000 by using the server level pool configuration information 1700 and the server level virtual volume configuration information 1800.

The leverage management module 1203 is a module which manages the end-to-end capacity leverage ratio by using the port/LUN correspondence information 1600, the end-to-end capacity leverage ratio information 1900 and the initial settings information 1910.

The respective modules included in the storage control program 1200 do not necessarily have to be modules of a single program, and may respectively be separate program codes.

<4-1. Information Managed by the Management Server>
<4-1-1. Storage Information>
<4-1-1a. Storage Level Pool Configuration Information>

FIG. 6 is a block diagram showing storage level pool configuration information 1400.

The storage level pool configuration information 1400 contains, for each storage level pool, information relating to the storage level pool and information relating to storage level virtual volumes corresponding to that storage level pool. More specifically, for example, the storage level pool configuration information 1400 is a table which contains, for each storage level pool, a record of the following attribute values: a storage level pool identifier 1401, a storage level pool capacity 1402, a storage level pool allocated capacity 1403, corresponding storage virtual volume identifiers 1404, a corresponding storage level virtual volume total capacity 1405, pool configuration volume identifiers 1406, and a storage apparatus identifier 1407.

The storage level pool capacity 1401 is an identifier of the storage level pool.

The storage level pool capacity 1402 is the capacity of the storage level pool.

The storage level pool allocated capacity 1403 is the total capacity of the area, out of the storage level pool capacity, which has been allocated to the storage level virtual volume.

The corresponding storage level virtual volume identifier 1404 is the identifier of a storage level virtual volume which corresponds to the storage level pool.

The corresponding storage level virtual volume total capacity 1405 is the sum value of the capacities of all of the storage level virtual volumes corresponding to the storage level pool.

The pool configuration volume identifiers 1406 are identifiers of volumes belonging to the storage level pool.

The storage apparatus identifier 1407 is an identifier of the storage apparatus containing the volumes belonging to the storage level pool.

Provided that the storage level pool information 1400 contains attribute values relating to the composition of the storage level pool 2220, a data structure other than a table may be employed, and attribute values relating to the configuration of a storage level pool 2220 other than the attribute values described above may also be included. Furthermore, the storage level pool information 1400 may omit a portion of the attribute values described above, apart from the storage level pool identifier 1401.

The information elements 1401 to 1406 described above are obtained, for example, from the information elements 11001 to 11006 in the storage level pool information 11000 (see FIG. 30) which is gathered by the management server 1000 from the storage apparatuses which make up the storage system. Furthermore, the information element 1407 is an information element which indicates which storage apparatus the storage level pool information 11000 has been gathered from.

<4-1-1b. Storage Level Virtual Volume Configuration Information>

FIG. 7 is a block diagram showing storage level virtual volume configuration information 1500.

The storage level virtual volume configuration information 1500 includes, for each storage level virtual volume, information relating to the storage level virtual volume, and information relating to the storage level pool corresponding to that storage level virtual volume. More specifically, for example, the storage level virtual volume configuration information 1500 is a table which contains, for each storage level virtual volume, a record of the following attribute values: a storage level virtual volume identifier 1501, a storage level virtual volume capacity 1502, a storage level virtual volume allocated capacity 1503, and a corresponding storage level pool identifier 1504.

The storage level virtual volume identifier 1501 is an identifier of the storage level virtual volume.

The storage level virtual volume capacity 1502 is the capacity of the storage level virtual volume.

The storage level virtual volume allocated capacity 1503 is the total capacity of the area, out of the storage level virtual volume capacity, which has been allocated to the storage level virtual volume from the storage level pool.

The corresponding storage level pool identifier 1504 is an identifier of the storage level pool corresponding to the storage level virtual volume.

Provided that the storage level virtual volume configuration information 1500 contains attribute values relating to a storage level virtual volume 2230, a data structure other than a table may be employed, and attribute values for a storage level virtual volume 2230 other than the attribute values described above may also be included. Furthermore, the storage level virtual volume 2230 information may omit a portion of the attribute values described above, apart from the storage level virtual volume identifier 1501.

The information elements 1501 to 1504 described above are obtained, for example, from the information elements 12001 to 12004 in the storage level pool information 11000 (see FIG. 31) which is gathered by the management server 1000 from the storage apparatuses which make up the storage system.

<4-1-2. Physical Server Information>
<4-1-2a. Server Level Pool Configuration Information>

FIG. 9 is a block diagram showing server level pool configuration information 1700.

The server level pool configuration information 1700 contains, for each server level pool, information relating to the server level pool and information relating to server level virtual volumes corresponding to that server level pool. More specifically, for example, the server level pool information 1700 is a table which contains, for each server level pool, a record of the following attribute values: a server level pool identifier 1701, a server level pool capacity 1702, a server allocated capacity 1703, corresponding server level virtual volume identifiers 1704, a corresponding server level virtual volume total capacity 1705, volume source storage apparatus identifiers 1706, and a configuration storage port number/LUN 1707.

The server level pool capacity 1701 is an identifier of the server level pool.

The server level pool capacity 1702 is the capacity of the server level pool.

The server level pool allocated capacity 1703 is the total capacity of the area, out of the server level pool capacity, which has been allocated to the server level virtual volumes.

The corresponding server level virtual volume identifiers 1704 are identifiers of server level virtual volumes which correspond to the storage level pool.

The corresponding server level virtual volume total capacity 1705 is the sum value of the capacities of all of the server level virtual volumes corresponding to the server level pool.

The volume source storage apparatus identifiers 1706 are identifiers of the storage apparatuses which provide the storage level virtual volumes corresponding to the server level pool, to the physical server 3000.

The configuration storage volume port number/LUN 1707 is a port number which allows the physical server 3000 to access a storage level virtual volume corresponding to the server level pool and a LUN whereby the physical server 3000 can recognize the storage level virtual volume by SCSI.

Provided that the server level pool configuration information 1700 contains attribute values relating to a server level pool 3210, a data structure other than a table may be employed, and attribute values relating to the server level pool 3210 other than the attribute values described above may also be included. Furthermore, the server level pool configuration information 1700 may omit a portion of the attribute values described above, apart from the server level pool identifier 1701.

The information elements 1701 to 1706 described above are obtained, for example, from the information elements 15001 to 15006 in the server level pool information 15000 (see FIG. 34) which is gathered by the management server 1000 from the physical servers. Furthermore, the information element 1507 is an information element that indicates which physical server the server level pool information 15000 has been gathered from.

<4-1-2b. Server Level Virtual Volume Configuration Information>

FIG. 10 is a block diagram showing server level virtual volume configuration information 1800.

The server level virtual volume configuration information 1800 includes, for each server level virtual volume, information relating to the server level virtual volume, and information relating to the server level pool corresponding to that server level virtual volume. More specifically, for example, the server level virtual volume information 1800 is a table which contains, for each server level virtual volume, a record of the following attribute values: a server level virtual volume identifier 1801, a server level virtual volume capacity 1802, a server level virtual volume allocated capacity 1803, a server level virtual volume unallocated capacity 1804, a server level virtual volume used capacity 1805, a corresponding server level pool identifier 1806, a corresponding virtual machine identifier 1807 and a device identifier for virtual machine recognition 1808.

The server level virtual volume identifier 1801 is an identifier of the server level virtual volume.

The server level virtual volume capacity 1802 is the capacity of the server level virtual volume.

The server level virtual volume allocated capacity 1803 is the total capacity of the area, out of the server level virtual volume capacity, which has been allocated to the server level virtual volume from the storage level pool.

The server level virtual volume unallocated capacity 1804 is the total capacity of the area (virtual area), out of the server level virtual volume capacity, to which storage area has not been allocated from the server level pool.

The server level virtual volume used capacity 1805 is the capacity to which data has been written by a virtual machine, out of the server level virtual volume capacity.

The corresponding server level pool identifier 1806 is an identifier of the server level pool corresponding to the server level virtual volume.

The corresponding virtual machine identifier 1807 is the identifier of the virtual machine which is the allocation destination of the server level virtual volume.

The device identifier for virtual machine recognition 1808 is an identifier whereby a virtual machine recognizes a server level virtual volume as a device (for example, as a hard disk drive).

Provided that the server level virtual volume configuration information 1800 contains attribute values relating to a server level virtual volume 3220, a data structure other than a table may be employed, and attribute values for a server level virtual volume 3220 other than the attribute values described above may also be included. Furthermore, the server level virtual volume 3220 information may omit a portion of the attribute values described above, apart from the server level virtual volume identifier 1801.

The information elements 1801 to 1804 and 1806 to 1808 described above are obtained, for example, from the information elements 16001 to 16008 in the server level virtual volume information 16000 (see FIG. 35) which is gathered by the management server 1000 from the physical servers. Furthermore, the information element 1805 is an information element which is determined by calculating the data volume written to the server level virtual volume by the virtual machine.

<4-1-3. Management Server Management Information>
<4-1-3a. Port-LUN Correspondence Information>

FIG. 8 is a block diagram showing port/LUN correspondence information 1600.

The port/LUN correspondence information 1600 is, for example, a table which contains, for each storage level virtual volume, a record of the attribute values: port # (port number) 1602, LUN 1603 and internal volume ID 1601.

The port #1602 is the port number used by a physical server 3000 to access a provided storage level virtual volume 2230, when the storage system 2000 has provided a storage level virtual volume 2230 to the physical server 3000.

The LUN 1603 is an identification number which allows the physical server 3000 to recognize by SCSI a storage level virtual volume 2230 provided by the storage system 2000.

The internal volume ID 1601 is an identifier for identifying a storage level virtual volume 2230 provided to a physical server 3000 by the storage system 2000.

Provided that the port/LUN correspondence information 1600 includes attribute values relating to the correspondences between the port number 1602, the LUN 1603 and the internal volume ID 1601, a data structure other than a table may be employed and attribute values for the correspondence between the port number 1602, LUN 1603 and internal volume ID 1601 other than the attribute values described above may also be included. Furthermore, the port/LUN correspondence information 1600 may omit a portion of the attribute values described above, apart from the internal volume ID 1601.

The information elements 1601 to 1603 described above can be created in the following way, for example. The correspondence information 1600 shown in FIG. 8 is constructed using the storage level virtual volume identifiers, port numbers and LUNs in the storage level virtual volume information 12000 (see FIG. 31) gathered from the storage apparatuses by the management server.

<4-1-3b. End-to-End Capacity Leverage Ratio Information>

FIG. 11 is a block diagram showing the end-to-end capacity leverage ratio information 1900.

The end-to-end capacity leverage ratio information 1900 is, for example, a table which contains, for each storage level pool, a storage level pool identifier 1901 and an end-to-end capacity leverage ratio 1902.

The storage level pool capacity 1901 is an identifier of the storage level pool.

The end-to-end capacity leverage ratio 1902 is the end-to-end capacity leverage ratio corresponding to the storage level pool (100☐ (total capacity of all server level virtual volumes corresponding to storage level pool)/(capacity of storage level pool)) (%).

Provided that the end-to-end capacity leverage ratio information 1900 includes attribute values relating to the capacity leverage ratio of the pool unit, a data structure other than a table may be employed and attribute values relating to the capacity leverage ratio of the pool unit other than the attribute values described above may also be included. Furthermore, the end-to-end capacity leverage ratio 1900 may omit a portion of the attribute values described above, apart from the storage level pool identifier 1901.

<4-1-3c. Initial Settings Information>

FIG. 12 is a block diagram showing initial settings information 1910.

The initial settings information 1910 is a table containing one or more records including the attribute values of end-to-end capacity leverage ratio threshold value 1911 and information gathering interval 1912, for example.

The end-to-end capacity leverage ratio threshold value 1911 is a threshold value indicating the upper tolerance limit of the capacity leverage ratio relating to the storage level pool 2220, which is input by the storage administrator via a setup screen of the management program 1200.

The information gathering interval 1912 is the interval between the timings at which the end-to-end capacity leverage ratio 1902 is calculated, as input by the storage administrator via the setup screen of the management program 1200.

Provided that the initial settings information 1910 contains attribute values relating to the initial settings input by the storage administrator, a data structure other than a table may be employed, and attribute values relating to the initial settings other than the attribute values described above may also be included. Furthermore, the initial settings information 1910 may omit a portion of the attribute values described above, apart from the information gathering interval 1912.

Figure 13:
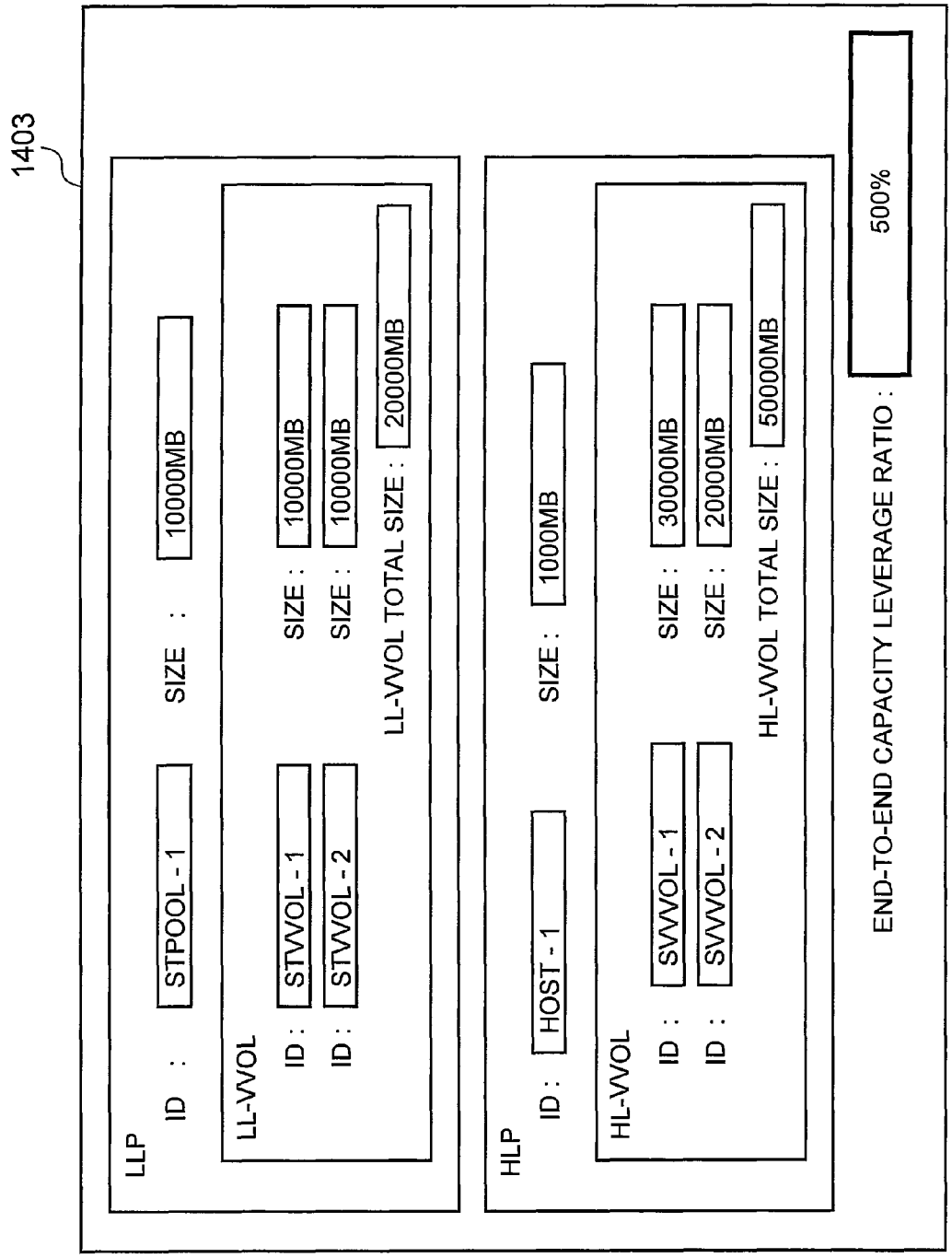
FIG. 13 shows a display screen of the end-to-end capacity leverage ratio.

FIG. 13 shows a display screen of the end-to-end capacity leverage ratio.

The leverage ratio display screen 1403 is a screen which is displayed by the management program 1200. The reason why, for example, the end-to-end capacity leverage ratio of the storage level pool "STPOOL-1" is 500% is as follows.

From the information 1400 in FIG. 6, the capacity "10000 MB" of the storage level pool corresponding to the identifier "STPOOL-1" is specified. Furthermore, the corresponding storage level virtual volume identifiers "STVVOL-1" and "STVVOL-2" which correspond to the identifier "STPOOL-1" are also specified.

The port number and LUN corresponding respectively to the identifiers "STVVOL-1" and "STVVOL-2" are specified from the information 1600 in FIG. 8.

Using these port numbers and LUNs, the server level pool identifier "SVPOOL-1" is specified from the information in FIG. 9.

Using this identifier "SVPOOL-1", the server level virtual volume capacities "30000 MB" and "20000 MB", in other words, a total capacity of "50000 MB", are specified from the information 1800 in FIG. 10.

As a result of the foregoing, a total capacity of "50000 MB" in the server level virtual volumes which correspond to the storage level pool is identified in respect of the capacity "10000 MB" of the storage level pool "STPOOL-1", and consequently, an end-to-end capacity leverage ratio of 100☐50000/10000=500%, is calculated.

The display format and display information shown in FIG. 13 are one example and other information apart from that shown in FIG. 13 may be displayed, provided that it relates to the end-to-end capacity leverage ratio. Furthermore, the GUI may also employ a different format.

<5. Thin Provisioning>

<5-1. Thin Provisioning in Storage System>

Figure 4:
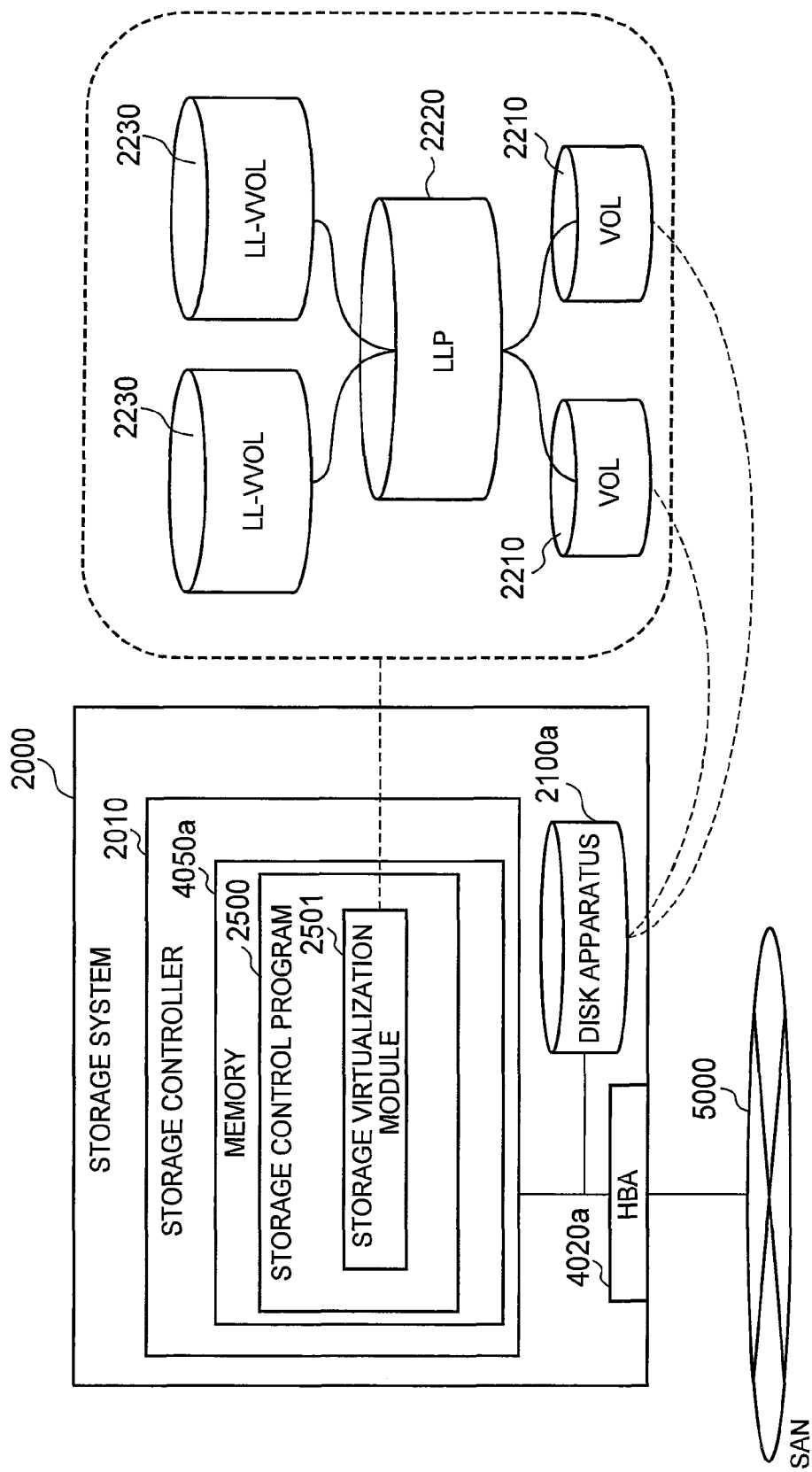
FIG. 4 is a diagram illustrating thin provisioning carried out in a storage system 2000.

FIG. 4 is a diagram illustrating thin provisioning carried out in a storage system 2000.

In the storage system 2000, volumes 2210, a storage level pool 2220 and storage level virtual volumes 2230 are constructed by a storage virtualization module 2501 of the storage control program 2500.

The volumes 2210 are constructed by the storage virtualization module 2501 grouping together the storage area of one or more PDEVs 2100a. The storage areas of the volumes 2210 are distributed and mapped to the storage area of one or more PDEVs 2100a which make up a volume 2210, under control implemented by the storage controller 4050.

The storage level pool 2220 is constructed by the storage virtualization module 2501. The storage area of the storage level pool 2220 is distributed and mapped to the storage area of one or more volumes 2210 which correspond to the storage level pool 2220, under control implemented by the storage controller 4050.

The storage level virtual volumes 2230 are constructed by the storage virtualization module 2501. The storage level virtual volumes 2230 have an address and a virtual storage area. In contrast to the storage area of the volumes 2210, the virtual storage area of the storage level virtual volumes 2230 does not correspond to a physical storage area belonging to a PDEV 2100a.

When a write request has been issued in respect of the virtual storage area of a storage level virtual volume 2230 (for example, an LL virtual page), then if a portion of the area inside the pool 2220 (for example, an LL actual page) has not been allocated to that virtual storage area, a portion of the area of the storage level pool 2220 is mapped dynamically under control implemented by the storage controller 4050a.

The whole of the virtual storage area of the storage level virtual volumes 2230 does not have to correspond to a physical storage area, such as a storage area of a PDEV 2100a, and therefore it is possible to set the virtual storage area (capacity) of the storage level virtual volumes 2230 to a value that is higher than the physical storage area of the storage system 2000 (for example, the capacity of the pool 2220).

The storage system 2000 provides the storage level virtual volumes 2230 to the physical server 3000. The physical storage area of the PDEV 4050a is accessed by the physical server 3000 via the storage level virtual volumes 2230 and the volumes 2210 which form the storage level pool 2220.

<5-1-1. Addition of Volume to Storage Level Pool>

Figure 26:
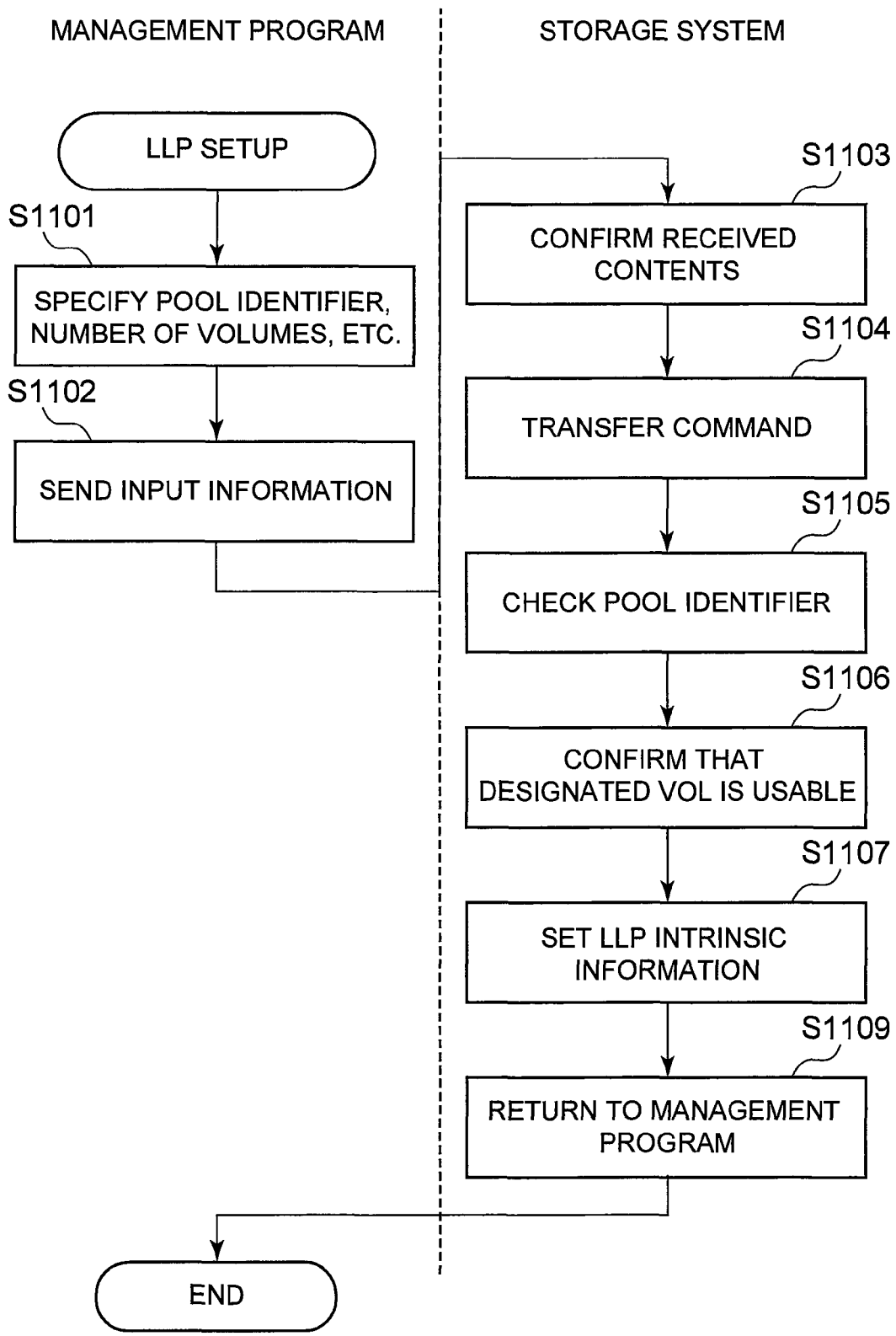
FIG. 26 is a flowchart showing a process of adding a volume 2210 to the storage level pool 2220.

FIG. 26 is a flow diagram showing processing for adding a volume 2210 to the storage level pool 2220.

The setup of the storage level pool 2220 is implemented by the storage virtualization module 2501.

(Step S1101) Firstly, the storage administrator inputs information about the volumes 2210 to be set in the storage level pool 2220, to the management program 1200. The identifier of the storage level pool 2220, the threshold value, the number of volumes 2210 and the volume identifiers are established.

(Step S1102) The storage management module 1201 generates a command instructing set-up of the storage level pool 2220 including the input information, and sends this command to the storage system 2000 via the NIC.

(Step S1103) In the storage system 2000, the command sent from the physical server 1000 is received by the command control module 2503, via the NIC.

The command control module 2503 recognizes the contents of the received command. If the contents of the command are invalid, then the module 2503 rejects the command (and returns an error, for example).

(Step S1104) If the command instructs the setting up of a storage level pool 2220, then the command control module 2503 passes on the received command to the storage virtualization module 2501. The storage virtualization module 2501 receives the command and starts storage level pool setup processing.

(Step S1105) The storage virtualization module 2501 firstly examines the storage level pool information 11000 and confirms that the storage level pool identifier 11001 relating to the command is valid. Furthermore, the storage virtualization module 2501 confirms whether the storage level pool identifier 11001 has not yet been defined.

(Step S1106) Thereupon, the storage virtualization module 2501 confirms whether or not the volume 2210 relating to the command is usable. More specifically, if the volume 2210 relating to the command is being formatted, for example, then that volume 2210 cannot be used and therefore the storage virtualization module 2501 rejects the command (by returning an error, for example). Furthermore, if the volume 2210 relating to the command is already in use (for example, if the path to the volume 2210 has been defined, if the volume is in use by a copy function, or the like, or if the volume has been reserved as a copy destination), then the storage virtualization module 2501 rejects the command since the volume 2210 is not usable.

(Step S1107) Thereupon, the storage virtualization module 2501 sets the storage level pool capacity 11002 and the volume identifier 11004 in the storage level pool information 11000. By means of this processing carried out by the storage virtualization module 2501, a volume 2210 is added to the storage level pool 2220.

(Step S1108) Next, the storage control program 2500 sends a reply indicating that the command was successful, to the management server 1000.

Upon receiving a reply from the storage system 2000, the storage configuration management module 2502 of the management server 1000 ends processing.

By means of the processing described above, a volume 2210 is added to the storage level pool 2220.

<5-1-2. Reading from Storage Level Virtual Volume>

Figure 24:
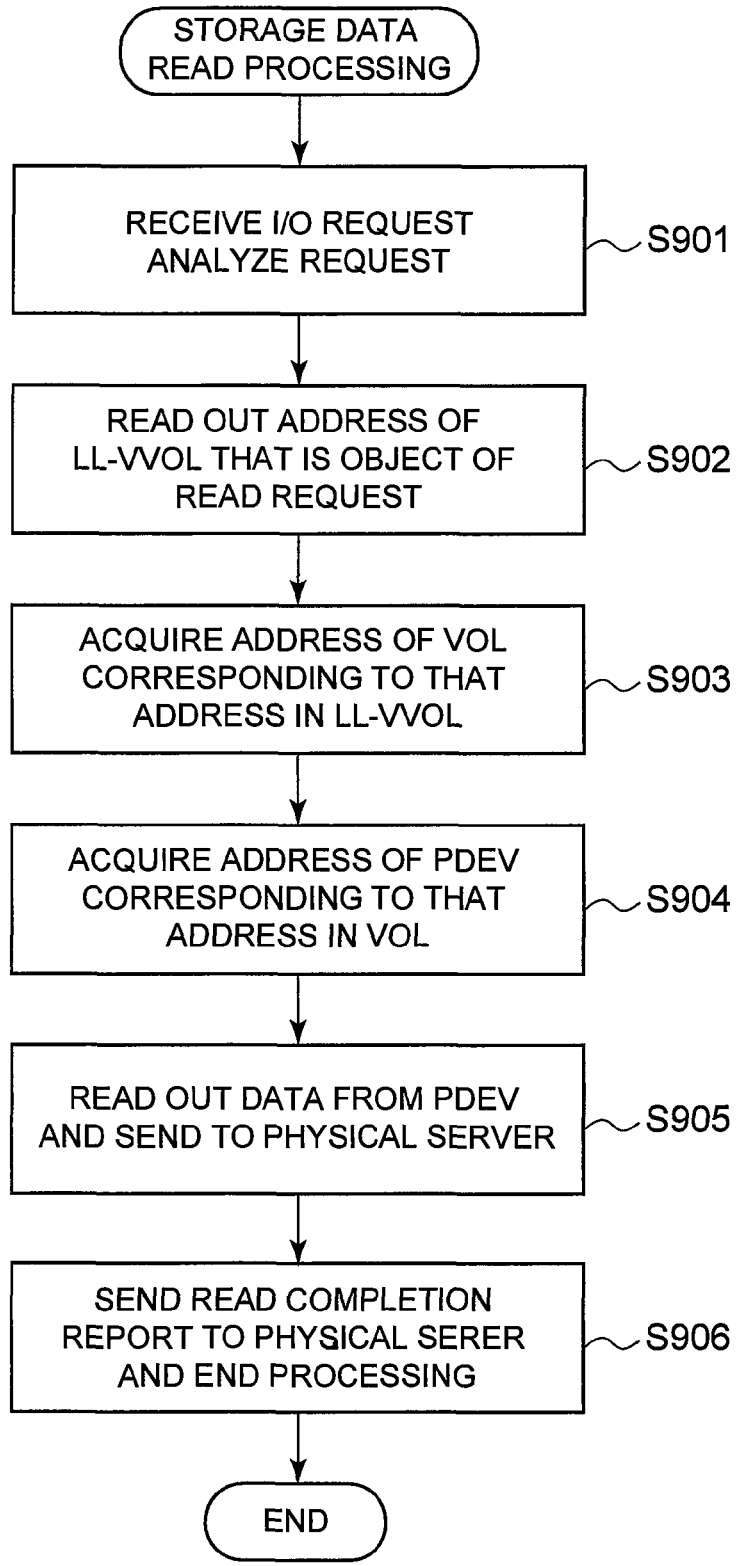
FIG. 24 is a flow diagram of processing for reading data from the storage level virtual volume.

FIG. 24 is a flow diagram of processing for reading data from a storage level virtual volume.

The physical server sends an I/O request by specifying the address of a storage level virtual volume. This I/O request is a data read request.

(Step S901) In the storage system 2000, the command control module 2503 receives an I/O request from the physical server 3000. If the content of the received I/O request is invalid, then this request is rejected (an error is returned, for example). If the content of the received I/O request is valid, then the command control module 2503 analyzes the content of the I/O request. As a result of this analysis, the command control module 2503 identifies that the I/O request is a data read request.

(Step S902) Next, the command control module 2503 acquires the address of the storage level virtual volume 2230 relating to the received request, which is to be read from.

(Step S903) Thereupon, the command control module 2503 acquires the address of the volume area that has been mapped to the address of the area in the read request, from the storage level pool 2220 corresponding to the storage level virtual volume 2230 that is to be read. In this case, the address of the area of the storage level virtual volume 2230 in the read request may have been distributed and mapped to the addresses of a plurality of volumes 2210.

(Step S904) Thereupon, the command control module 2503 refers to the volume information 14000, identifies the PDEV 2100a corresponding to the address of the area of the volume 2210, and acquires the address of that PDEV 2100a.

(Step S905) Thereupon, the command control module 2503 reads out data relating to the request from the address of the PDEV 2100a and sends this data to the physical server 3000.

(Step S906) The command control module 2503 then sends a read request completion report to the physical server 3000 and ends processing.

<5-1-3. Writing to Storage Level Virtual Volume>

Figure 25:
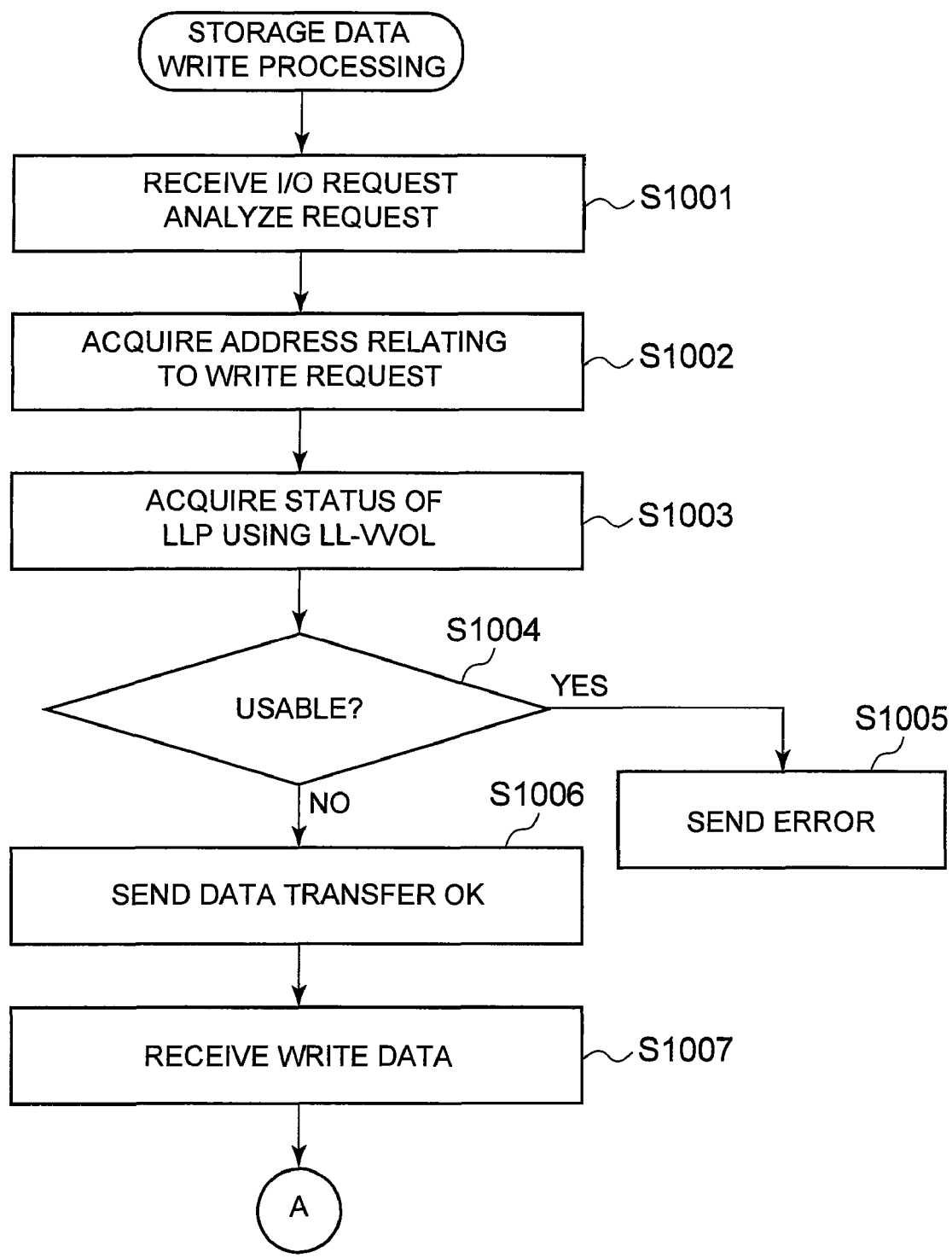
FIG. 25 is a portion of a flow diagram showing a process of writing data to a storage level virtual volume 2230.
Figure 39:
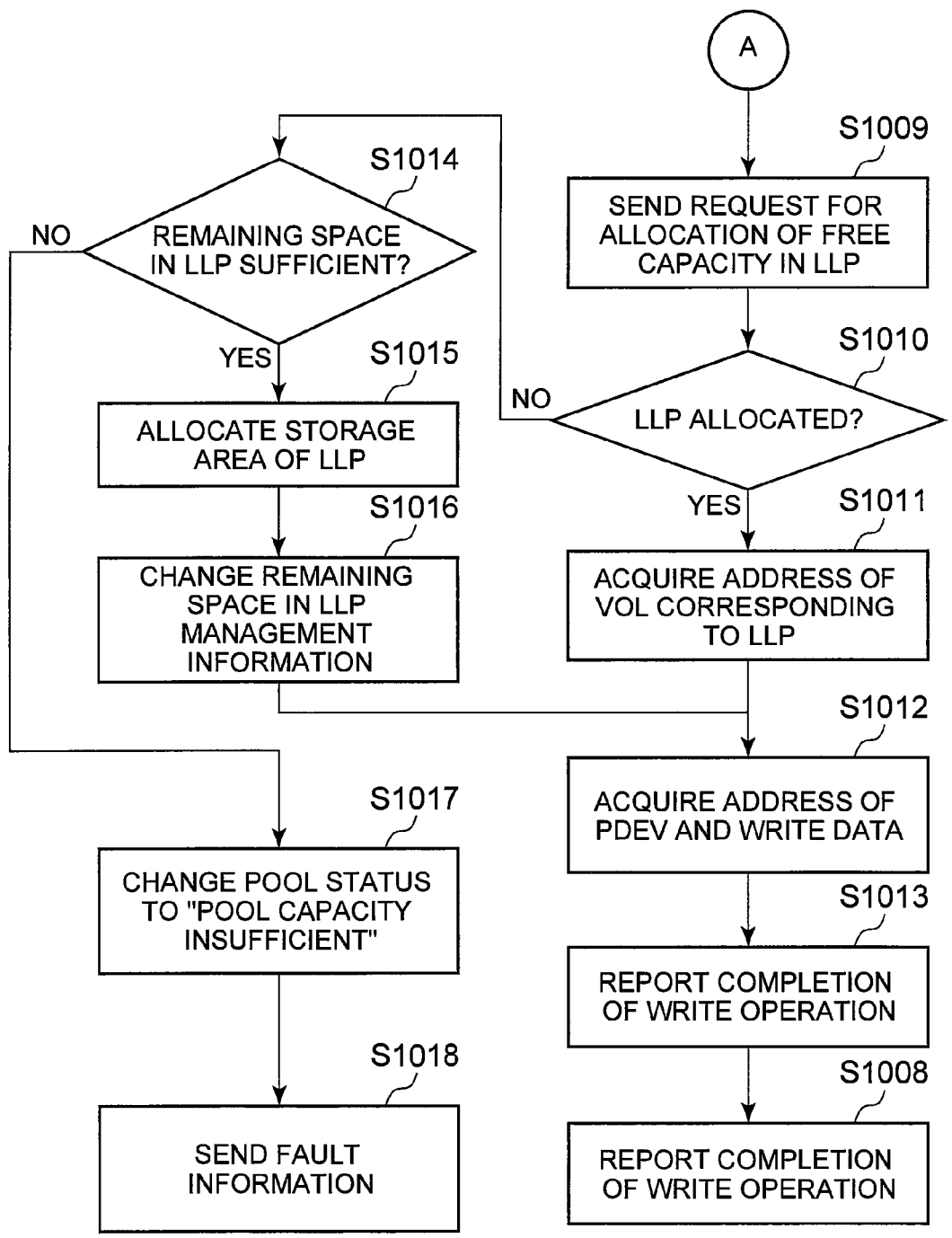
FIG. 39 is the remainder of a flow diagram showing a process of writing data to a storage level virtual volume 2230.

FIG. 25 is a portion of a flow diagram showing a process of writing data to a storage level virtual volume 2230, and FIG. 39 is the continuation of this flow diagram.

The physical server 3000 sends an I/O request by specifying an address of a storage level virtual volume 2230. This I/O request is a data write request.

(Step S1001) In the storage system 2000, the command control module 2503 receives an I/O request from the physical server 3000. If the received I/O request is invalid, then this request is rejected (an error is returned, for example). The command control module 2503 then analyzes the content of this I/O request. As a result of this analysis, the command control module 2503 identifies that the I/O request is a data write request.

(Step S1002) Next, the command control module 2503 acquires the address of the storage level virtual volume 2230 relating to the received write request.

(Step S1003) Thereupon, the command control module 2503 refers to the storage level virtual volume information 12000, identifies the storage level pool 2220 corresponding to the storage level virtual volume 2230 and acquires the status of the pool.

(Step S1004) The command control module 2503 refers to the storage level pool information 11000, identifies the volume 2210 corresponding to the storage level pool 2220, and judges whether or not the volume 2210 is usable.

(Step S1005) If the volume 2210 is not usable, then access to the volume 2210 is not possible, and therefore the command control module 2503 sends an I/O error to the physical server 3000.

(Step S1006) If it is judged that the volume 2210 is usable, then the command control module 2503 sends a notification that the transfer of write data is possible, to the physical server 3000 which sent the request. The physical server 3000 receives this and sends write data to the storage system 2000.

(Step S1007) The command control module 2503 receives the write data sent by the physical server 3000.

(Step S1009) The command control module 2503 starts processing for allocating free space in the storage level pool 2220 to the address of the storage level virtual volume 2230 that is to be written to.

(Step S1010) The storage virtualization module 2501 firstly refers to the storage level virtual volume information 12000 and confirms that the storage level pool 2220 corresponding to that storage level virtual volume 2230 has been allocated.

(Step S1011) If it is judged that the storage level pool 2220 corresponding to the storage level virtual volume 2230 has already been allocated, then the storage virtualization module 2501 refers to the storage level pool information 11000, identifies the volume 2210 corresponding to the storage level pool 2220, and acquires the address of the area of that volume 2210.

(Step S1012) Thereupon, the storage virtualization module 2501 refers to the volume information 13000, identifies the PDEV 2100*a* corresponding to the volume 2210, acquires the address of the area of the PDEV 2100*a* and writes the write data (the data appended to the write request).

(Step S1013) Upon completing the writing of the write data, the storage virtualization module 2501 reports the end of writing to the command control module 2503.

(Step S1008) The command control module 2503 receives this report, sends a write request completion report to the physical server 3000 and ends processing.

(Step S1014) On the other hand, if it is judged that the storage level pool 2220 has not been allocated to the storage level virtual volume 2230, firstly, the storage virtualization module 2501 refers to the storage level pool information 11000 and confirms whether there is sufficient capacity to store the write data in the storage level pool 2220.

(Step S1015) If the remaining space in the storage level pool 2220 is judged to be sufficient (for example, if it is judged that space equal to or greater than the write data is remaining), then the storage virtualization module 2501 newly allocates the area of the storage level pool 2220 to the storage level virtual volume 2230. The module 2501 stores the identifier of the storage level pool 2220 as the storage level pool identifier 12004 of the storage virtual volume information 12000. Furthermore, the module 2501 stores the identifier of the storage level virtual volume 2230 as the storage level virtual volume identifier 11004 corresponding to the storage level pool identifier 11001 of the storage level pool 2220 of which storage area has been allocated, in the storage level pool information 11000.

(Step S1016) The module 2501 then changes the storage level pool capacity 11002 and carries out step S1014.

(Step S1017) On the other hand, if the remaining space in the storage level pool 2220 is judged not to be sufficient, then the storage virtualization module 2501 changes the status of the management information of the storage level pool 2220 to "pool capacity insufficient".

(Step S1018) The module 2501 then reports the pool capacity insufficiency to the physical server 3000 that issued the I/O request and the storage system 2000.

By means of the processing described above, processing of a data write request by the physical server 3000 is completed.

<5-1. Thin Provisioning in Server>

Figure 5:
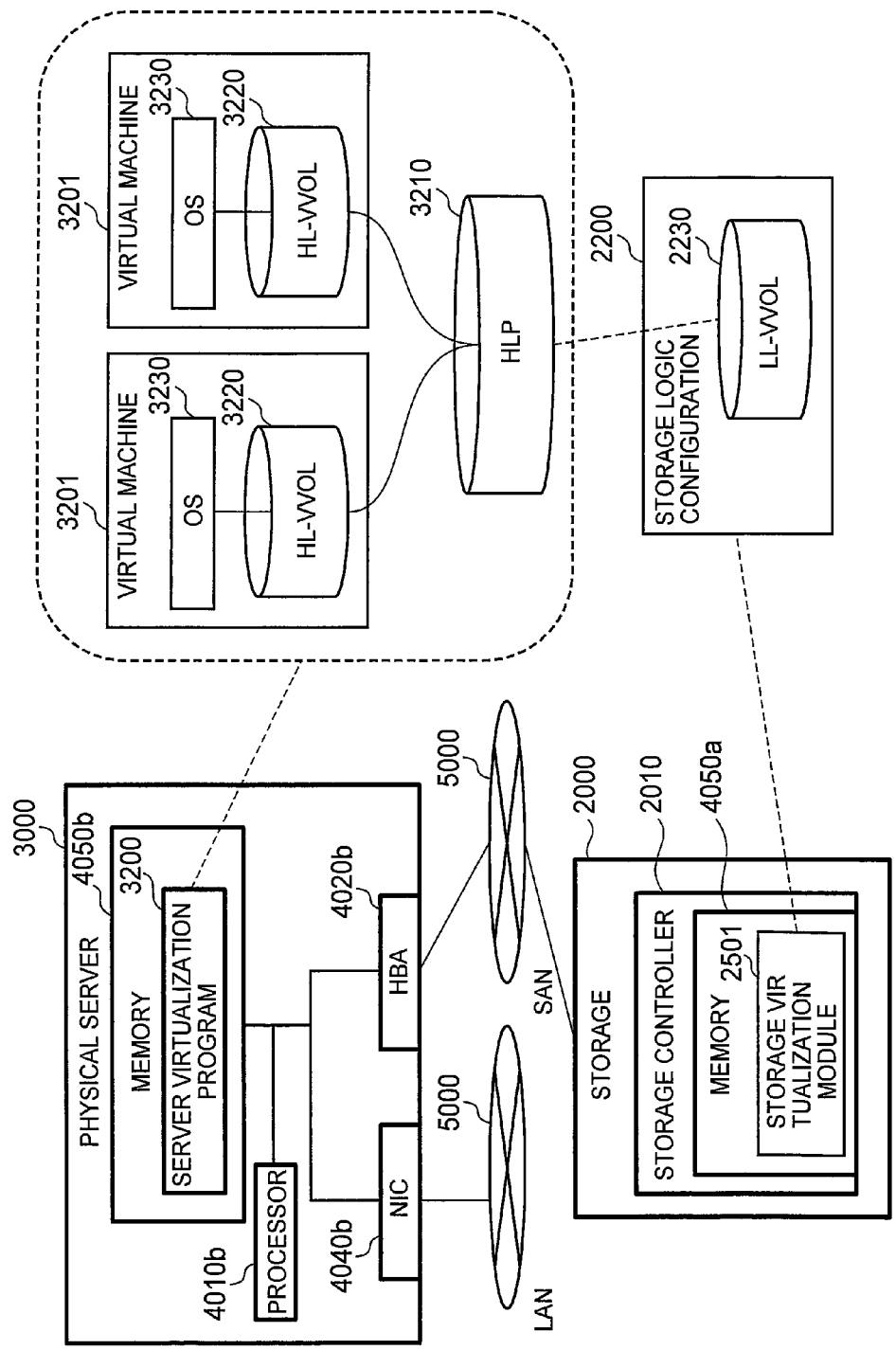
FIG. 5 is a diagram illustrating thin provisioning carried out in a physical server 3000.

FIG. 5 is a diagram illustrating thin provisioning carried out in a physical server 3000.

In the physical server 3000, a server level pool 3210, server level virtual volumes 3220 and virtual machines 3201 are constructed by the server virtualization program 3200. The server level pool 3210 is a pool for sharing use of the storage area of a plurality of storage level virtual volumes 2230 which are provided by the storage system 2000. The server level pool 3210 is constructed from one or more storage level virtual volumes 2230 allocated from the storage system 2000 by the server virtualization program 3200. The server level pool 3210 principally uses a file system format, and stores image files of the virtual machines 3201 and image files of the server level virtual volumes 3220, and the like. Furthermore, a management area for the server level virtual volumes 3220 is reserved inside the server level pool 3210. This management area stores address information for the virtual storage areas of the server level virtual volumes 3220, mapping information on mapping to the storage level virtual volumes 2230 provided by the storage system 2000, and the like. The server level virtual volumes 3220 are constructed by the server virtualization program 3200. The server level virtual volumes 3220 each have a virtual storage area. In response to a write request from a virtual machine 3201, the server virtualization program 3200 dynamically maps an area of the required capacity from the virtual storage area of a server level virtual volume 3220 to the storage area of the server level pool 3210.

The virtual machines 3201 are virtual computers which are constructed by the server virtualization program 3200. In the virtual server environment, a plurality of virtual machines 3201 operate by sharing the physical resources of a physical server. Similarly to a physical server, a virtual machine 3201 can be installed with an OS 3230, and can be used as an independent server machine. The virtual machine 3201 accesses the storage area of the server level pool 3210 via a server level virtual volume 3220.

Access from a virtual machine 3201 to the server level virtual volume 3220 is controlled by the server virtualization program 3200. By this means, the server level virtual volume 3220 is recognized in the same way as a SCSI device having a physical storage area, by the OS 3230 of the virtual machine 3201. The control performed by the server virtualization program 3200 includes the processes of reading, writing and capacity inquiry, with respect to the server level virtual volumes 3220, and these processes are described hereinafter. A capacity inquiry request issued by the OS 3230 running on the virtual machine 3201 is a request for acquiring the capacity of a server level virtual volume 3220 which is necessary when the OS 3230 is to use that volume.

In the description given below, SCSI is used as an example of the I/O protocol issued to the server level virtual volume 3220 by the OS 3230 executed on the virtual machine 3201. However, as an alternative to a SCSI protocol, it is also possible to employ other block access type protocols, such as IDE or SAS, for example.

<5-1-1. Setting Up Server Level Pool>

Figure 21:
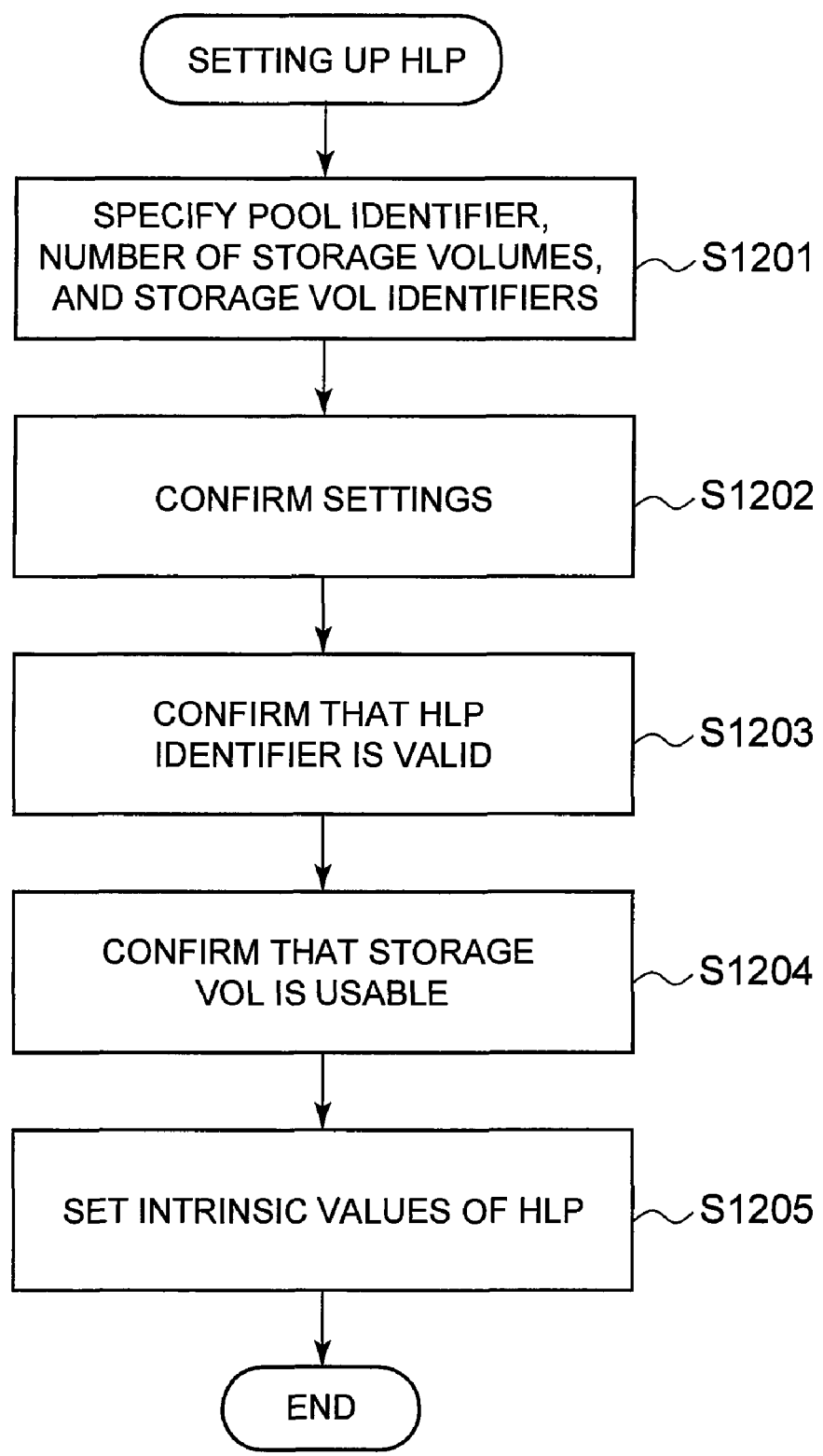
FIG. 21 is a flow diagram showing the processes of setting up and adding a storage level virtual volume 2230 to a server level pool 3210.

FIG. 21 is a flow diagram showing the processes of setting up and adding a storage level virtual volume 2230 to the server level pool 3210.

(Step S1201) Firstly, the storage administrator inputs information about the volumes to be set in the server level pool 3210, to the server virtualization program 3200. Storage level virtual volumes provided from the storage system 2000 are used as the volumes set in the server level pool 3210. The identifier and threshold value of the server level pool 3210, and the number and LUN 1603 of the storage level virtual volumes 2230 are established.

(Step S1202) The server virtualization program 3200 confirms whether or not the command instructing the setup of the server level pool 3210 and containing the input information is valid. If the command is invalid, then the program 3200 rejects the command (and returns an error, for example).

(Step S1203) The server virtualization program 3200 firstly refers to the server level pool information 15000 and confirms that the server level pool identifier 1801 relating to the command is valid.

(Step S1204) Thereupon, the server virtualization module 3200 confirms whether or not the storage level virtual volume 2230 relating to the command is usable. More specifically, if the storage level volume 2230 relating to the command is being formatted, for example, then that storage level virtual volume 2230 cannot be used and therefore the program 3200 rejects the command (by returning an error, for example). Furthermore, if the storage level virtual volume 2230 relating to the command is already in use (for example, if the path to the storage level virtual volume 2230 has been defined), then that storage level virtual volume 2230 is not usable and the program 3200 rejects the command.

(Step S1205) Next, the server virtualization program 3200 sets the server level pool capacity 15002 and the configuration storage port number/LUN 15006 in the server level pool information 15000. By means of this processing performed by the server virtualization program 3200, a storage level virtual volume 2230 is set in the server level pool 3210.

<5-1-2. I/O to Server Level Virtual Volume>

<5-1-2a. Processing of Capacity Inquiry Request in Relation to Server Level Virtual Volume>

This process is started upon detection of the issue of a read request in which the OS 3230 on the virtual machine 3201 specifies a device identifier for virtual machine recognition 1808, a block address and a block length, which is the object of a capacity inquiry.

The OS 3230 on the virtual machine 3201 specifies a device identifier for virtual machine recognition 1808 and sends a capacity inquiry request by SCSI. In response to this request, the server virtualization program 3200 returns the capacity of the server level virtual volume 3220 to the OS 3230 on the virtual machine 3201, by carrying out the processing described below. By this means, the OS 3230 on the virtual machine 3201 is able to recognize the server level virtual volume 3220 as a SCSI device.

(Step A) The server virtualization program 3200 receives a capacity inquiry request sent by the OS of the virtual machine 3201.

(Step B) The server virtualization program 3200 analyzes the content of the request. The program then refers to the server level virtual volume information 16000 and specifies the server level virtual volume identifier 16001 corresponding to the device identifier for virtual machine recognition 16007 which is the destination of the inquiry.

(Step C) The server virtualization program 3200 identifies the virtual disk file inside the server level pool 3210 which corresponds to the server level virtual volume identifier 16001. A virtual disk file is a file which holds the data that is stored in a server level virtual volume 3220, and the virtual disk file is stored in the server level pool 3210 which adopts a file system format.

(Step D) The server virtualization program 3200 returns a value that has been set as the capacity of the server level virtual volume 3220, as the disk size of the SCSI device recognized by the OS 3230 running on the virtual machine 3201, and returns the size of the virtual disk file identified in step C, as the used capacity.

(Step E) The server virtualization program 3200 sends a capacity inquiry request completion report to the OS 3230 on the virtual machine 3201 and then ends processing.

By means of the processing described above, the OS 3230 on the virtual machine 3201 is able to recognize the server level virtual volume 3220 as a SCSI device.

<5-1-2b. Processing of Read Request to Server Level Virtual Volume>

Figure 22:
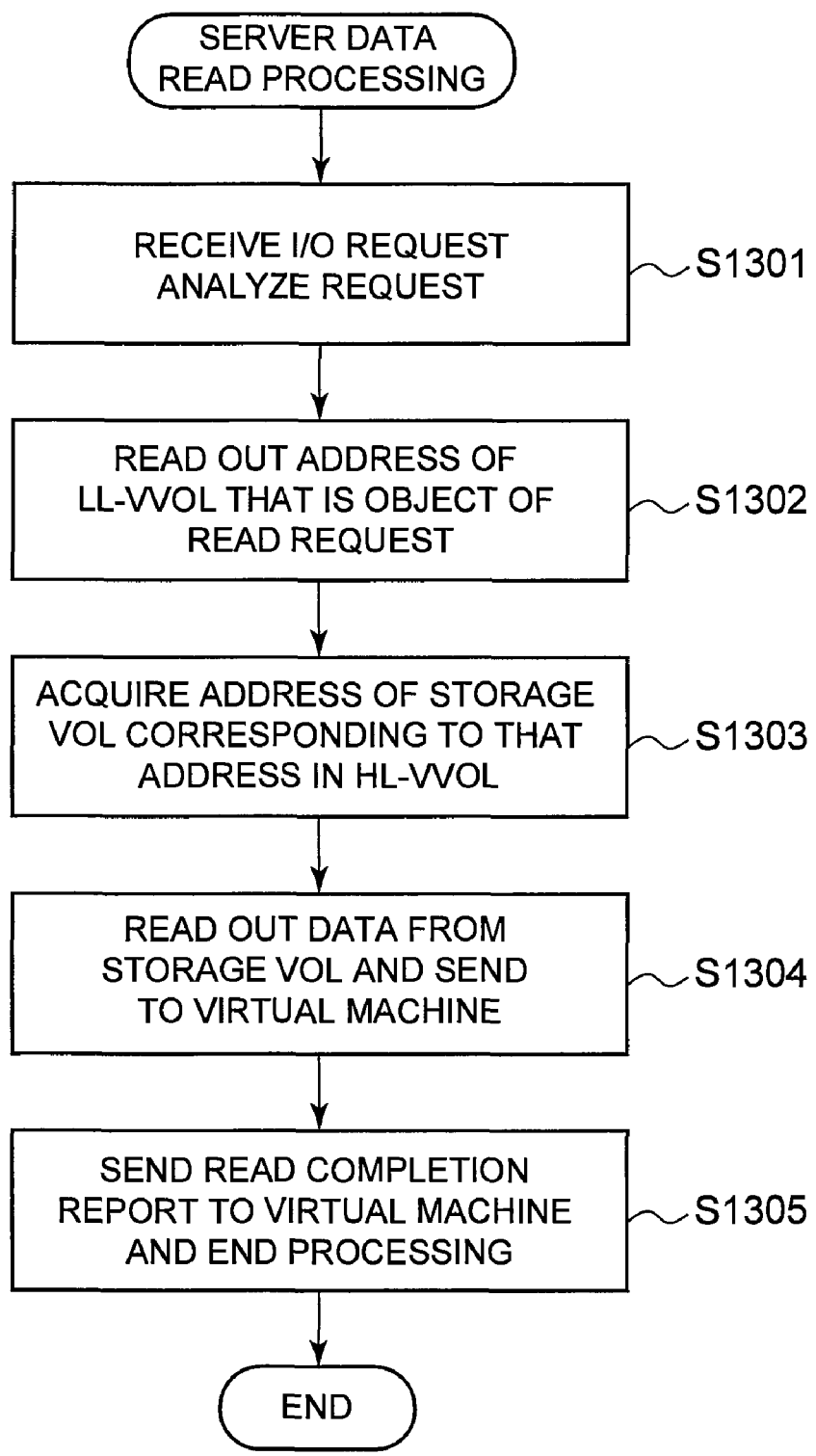
FIG. 22 is a flow diagram of processing carried out when the server virtualization program has received a read request from a virtual machine to a server level virtual volume.

FIG. 22 is a flow diagram of processing carried out when the server virtualization program has received a read request from a virtual machine to a server level virtual volume.

This process is started when the server virtualization program 3200 detects the issue of a read request in which the OS 3230 on the virtual machine 3201 specifies the identifier of a server level virtual volume 3220 that is to be read from, and a block address and block length.

(Step S1301) The server virtualization program 3200 receives an I/O request from the virtual machine 3201. If the content of the received I/O request is invalid, then the program 3200 rejects the request (by returning an error, for example). If the content of the received I/O request is valid, then the program 3200 analyzes the content of the I/O request. As a result of this analysis, the server virtualization program 3200 identifies that the I/O request is a data read request.

(Step S1302) Next, the server virtualization program 3200 acquires the address of the server level virtual volume 3220 relating to the received request, which is to be read from.

(Step S1303) Next, the server virtualization program 3200 refers to the server level virtual volume information 16000, and acquires the address of the area of the storage level virtual volume 2230 which has been mapped to the address of the area in the read request, from the server level pool 3210 corresponding to the server level virtual volume 3220 that is to be read from. In this case, the address of the area in the read request to the storage level virtual volume 3220 may have been distributed and mapped to the addresses of a plurality of storage level virtual volumes 2230.

(Step S1304) Thereupon, the server virtualization program 3200 reads out data relating to the request from that address in the storage level virtual volume 2230, and sends the data to the virtual machine 3201.

(Step S1305) A read request completion report is then notified to the virtual machine 3201 and processing is terminated.

<5-1-2c. Processing of Write Request to Server Level Virtual Volume>

Figure 23:
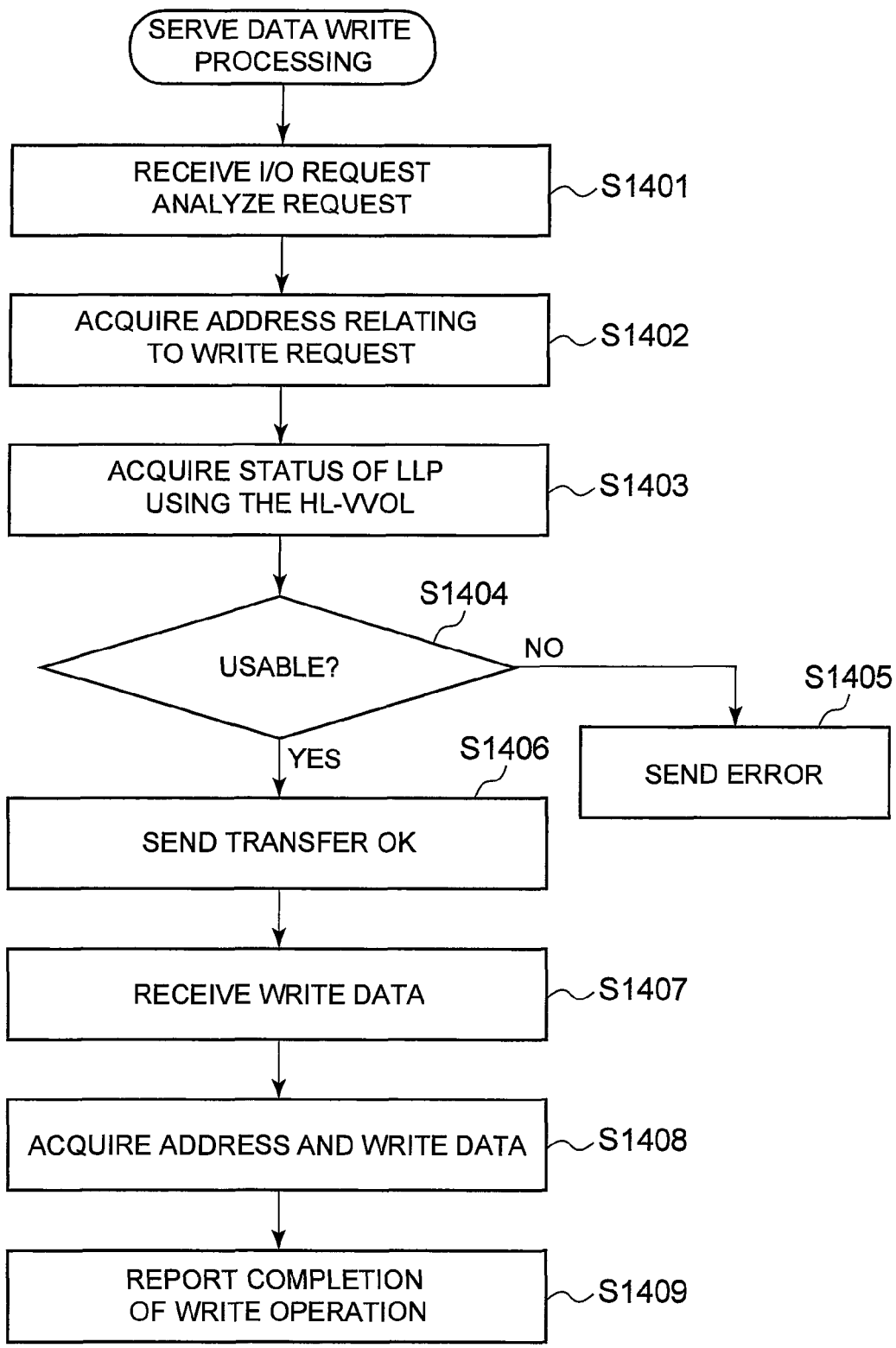
FIG. 23 is a flow diagram of processing carried out when the server virtualization program has received a write request from a virtual machine to a server level virtual volume.

FIG. 23 is a flow diagram of processing carried out when the server virtualization program has received a write request from a virtual machine to a server level virtual volume.

This process is started when the server virtualization program 3200 detects the issue of a write request in which the OS 3230 on the virtual machine 3201 specifies the identifier of a server level virtual volume 3220 that is to be written to, and a block address and block length.

(Step S1401) In the physical server 3000, the server virtualization program 3200 receives an I/O request from the virtual machine 3201. If the received I/O request is invalid, the program 3200 rejects that I/O request. If the received I/O request is valid, then the program 3200 analyzes the content of the I/O request. As a result of this analysis, the server virtualization program 3200 identifies that the I/O request is a data write request.

(Step S1402) Thereupon, the server virtualization program 3200 refers to the server level virtual volume information 16000 and acquires the address of the server level virtual volume 3220 relating to the received write request.

(Step S1403) Next, the server virtualization program 3200 refers to the server level virtual volume information 16000, identifies the server level pool 3210 corresponding to the server level virtual volume 3220 and acquires the status of that server level pool 3210.

(Step S1404) The program 3200 then judges whether or not the storage level virtual volume 2230 corresponding to the server level pool 3210 is usable.

(Step S1405) If the storage level virtual volume 2230 is not usable, then that volume 2210 cannot be accessed and therefore the server virtualization program 3200 reports an I/O error to the virtual machine 3201.

(Step S1406) If it is judged that the storage level virtual volume 2230 is usable, then the server virtualization program 3200 sends a notification that the transfer of write data is possible, to the virtual machine 3201 which sent the request. Upon receiving this notification, the virtual machine 3201 sends write data to the physical server 3000.

(Step S1407) The server virtualization program 3200 receives write data sent by the virtual machine 3201.

(Step S1408) The server virtualization program 3200 firstly refers to the server level pool information 15000, identifies the configuration storage port number/LUN 15006 corresponding to the server level pool 3210, acquires the address of the area of the LUN and writes data.

(Step S1409) Upon completing the writing of the write data, the server virtualization program 3200 sends a write request completion report to the virtual machine 3201 and then ends processing.

<6. Processing Steps in First Embodiment>

If too large a virtual volume capacity is set in respect of a limited physical storage capacity (for instance, the capacity of a storage level pool), then it is difficult to predict the rate of consumption of the physical storage capacity and the possibility of depletion of the physical storage capacity increases. Therefore, it is necessary to keep the ratio of the virtual volume capacity with respect to the physical storage capacity (the leverage ratio) at or below a set level.

In the processing according to a first embodiment, the storage administrator sets a threshold value for the end-to-end capacity leverage ratio, in the management server 1000. If the end-to-end capacity leverage ratio exceeds the threshold value, the management server 1000 detects this and indicates that the end-to-end capacity leverage ratio has exceeded the threshold value. By this means, the storage administrator is able to identify sharp rise in the end-to-end capacity leverage ratio.

The processing carried out by the management program in the first embodiment is now described with reference to FIG. 14 and FIG. 15.

<6-1. Processing for Calculating and Displaying End-to-End Capacity Leverage Ratio as Performed by Management Program>

Figure 14:
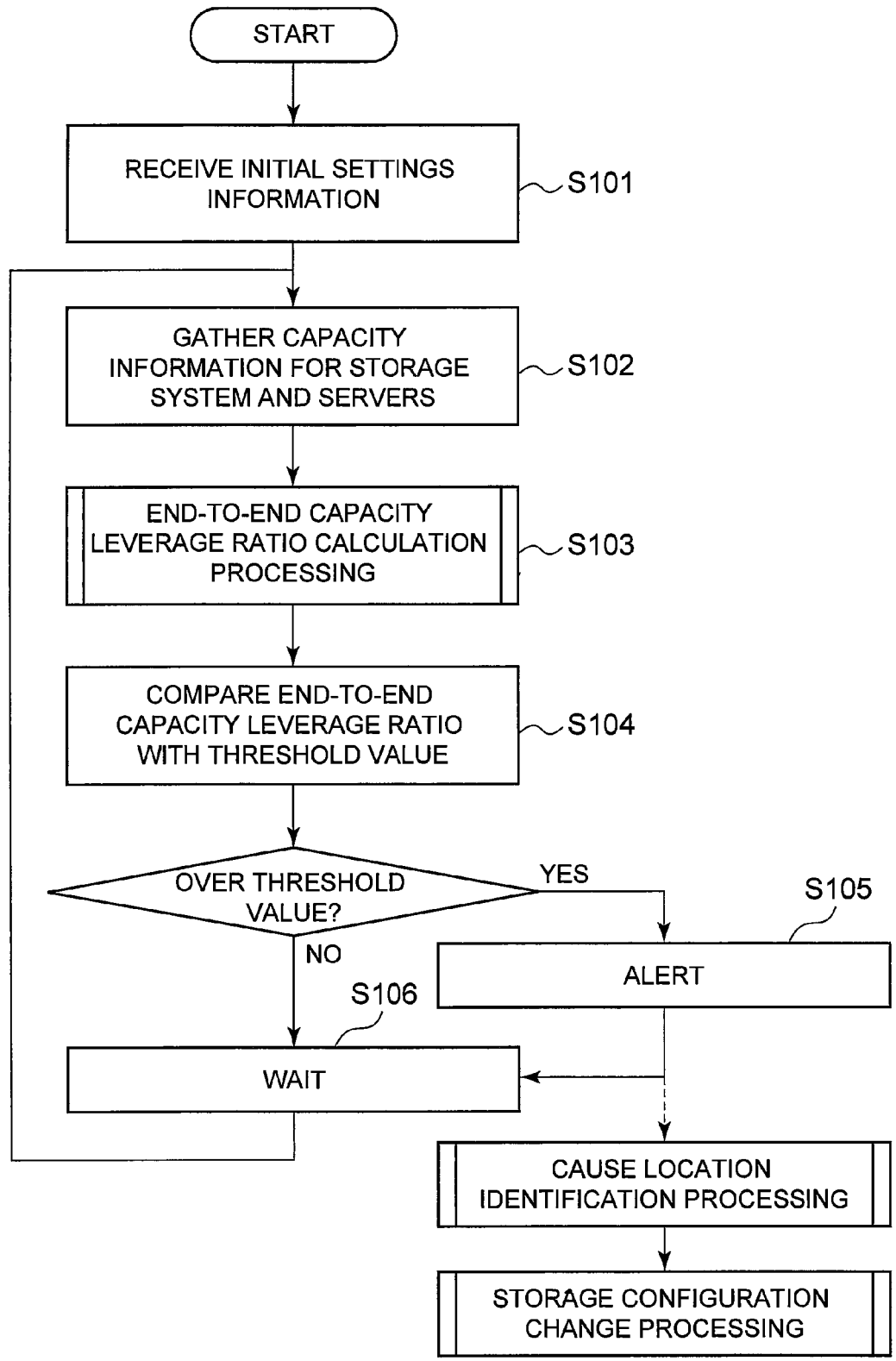
FIG. 14 is a flow diagram of processing carried out by the management program 1200 according to a first embodiment.

FIG. 14 is a flow diagram of processing carried out by the management program 1200. The details of the individual steps are described below.

(Step S101) The management program 1200 receives initial settings information 1910 which has been input by the storage administrator via the setup screen of the management program 1200. The threshold value of the capacity leverage ratio and the interval for gathering capacity information are included in the initial settings information 1910. The threshold value of the capacity leverage ratio is a value which indicates the tolerable upper limit of the virtual volume capacity corresponding to the physical storage capacity, and the storage administrator sets this threshold value on the basis of a capacity schedule. Furthermore, the interval between gathering capacity information is the interval between the times at which the management program 1200 carries out the processing described below. Moreover, the storage management module 1201 receives information specifying the storage level pool 2220 from the storage administrator, and on the basis of this information, determines the storage level pool identifier 1401 for which the end-to-end capacity leverage ratio is to be calculated. The management program 1200 then stores the input threshold value for the capacity leverage ratio as the end-to-end capacity leverage ratio threshold value 1911 in the initial settings information 1910, and stores the interval for gathering capacity information as the information gathering interval 1912 in same. Furthermore, the storage management module 1201 stores an identifier of the storage level pool determined as the object of end-to-end capacity leverage ratio calculation as the storage level pool identifier 1901 in the end-to-end capacity leverage ratio information 1900.

(Step S102) The management program 1200 gathers the capacity information for the storage system 2000 and the capacity information for the physical server 3000, after the information gathering interval 1912 set by the storage administrator has elapsed, in other words, when the time for gathering capacity information arrives. More specifically, for example, the storage management module 1201 of the management program 1200 acquires the capacity information of the storage system 2000 from the storage system 2000, and the server management module 1202 of the management program 1200 gathers capacity information for the physical server 3000. The specific method of gathering capacity information is described below.

(Step S103) A leverage management module 1203 of the management program 1200 carries out processing for calculating the end-to-end capacity leverage ratio on the basis of the acquired capacity information of the physical server 3000 and the capacity information of the storage level pool 2220 specified by the storage administrator. The details of the processing of the end-to-end capacity leverage ratio are described later with reference to FIG. 20.

(Step S104) The leverage management module 1203 judges whether the end-to-end capacity leverage ratio value 1902 in the end-to-end capacity leverage ratio information 1900 is higher than the end-to-end capacity leverage ratio threshold value 1911 in the initial settings information 1910. If the value 1902 is judged to be higher than the threshold value 1911, then step S105 is executed, whereas if it is not higher, then step S102 is executed.

(Step S105) The leverage management module 1203 displays an alert which announces that the end-to-end capacity leverage ratio 1902 has risen sharply and the possibility of depletion of the physical storage capacity has increased. Moreover, the leverage management module 1203 displays a chart of the value of the end-to-end capacity leverage ratio 1902, the storage level pool capacity 1402, the storage level virtual volume identifier 1501 and the storage level virtual volume capacity 1502, on the capacity leverage ratio display screen 1403 of the management program 1200. The information reported on the display screen of the management program 1200 may be information other than that stated above, provided that the information is able to convey to the storage administrator the fact that the possibility of depletion of the physical capacity of the storage level pool 2220 has increased.

(Step S106) On the other hand, if the result of the comparison shows that the end-to-end capacity leverage ratio 1902 has not exceeded the end-to-end capacity leverage ratio threshold value 1911, then after the information gathering interval 1912 has elapsed, the procedure returns to step S102.

In the example described above, the storage level pool capacity 1402 and the server level virtual volume capacity 1802 were used in calculating the end-to-end capacity leverage ratio 1902, but it is also possible to use other values from the tables to which these respective columns belong.

<6-1-1. Capacity Information Gathering Process>

Below, the details of the capacity information gathering process which is mentioned in overview in step S102 in FIG. 14 will be described.

(Step A) The storage management module 1201 gathers the identifier of the storage level virtual volume corresponding to the specified storage level pool identifier 1401, from the storage level pool information 11000 held by the storage system 2000, and stores the gathered identifier as the corresponding storage level virtual volume identifier 1404 in the storage level pool configuration information 1400.

(Step B) The storage management module 1201 refers to the port/LUN correspondence information 1600 and acquires the port number 1601 and LUN 1602 allocated to the corresponding storage level virtual volume identifier 1404 which was gathered at step A.

(Step C) The server management module 1202 gathers the identifier of the server level pool 3210 corresponding to the storage level virtual volume 2230 allocated with the port number 1601 and LUN 1602 acquired by the storage management module 1201 at step B, from the server level pool information 15000 in the physical server 3000, and stores this identifier as the server level pool identifier 1701 in the server level pool configuration information 1700. The server level pool 3210 corresponding to the storage level virtual volume 2230 means the server level pool 3210 which has been set up so that the storage level virtual volume 2230 belongs thereto.

(Step D) The server management module 1202 gathers the identifiers and capacities of all of the server level virtual volumes 3220 corresponding to the gather server level pool identifier 1701, from the server level pool information 15000 in the physical server 3000. The server management module 1202 stores the identifiers of the server level virtual volumes 3220 as the corresponding server level virtual volume identifiers 1704 in the server level pool configuration information 1700 and as the server level virtual volume identifiers 1801 in the server level virtual volume configuration information 1800. Furthermore, the respective server level virtual volume capacities are stored as the server level virtual volume capacity 1802 in the server level virtual volume configuration information 1800.

<6-1-2. Details of Processing for Calculating End-to-End Capacity Leverage Ratio>

Figure 15:
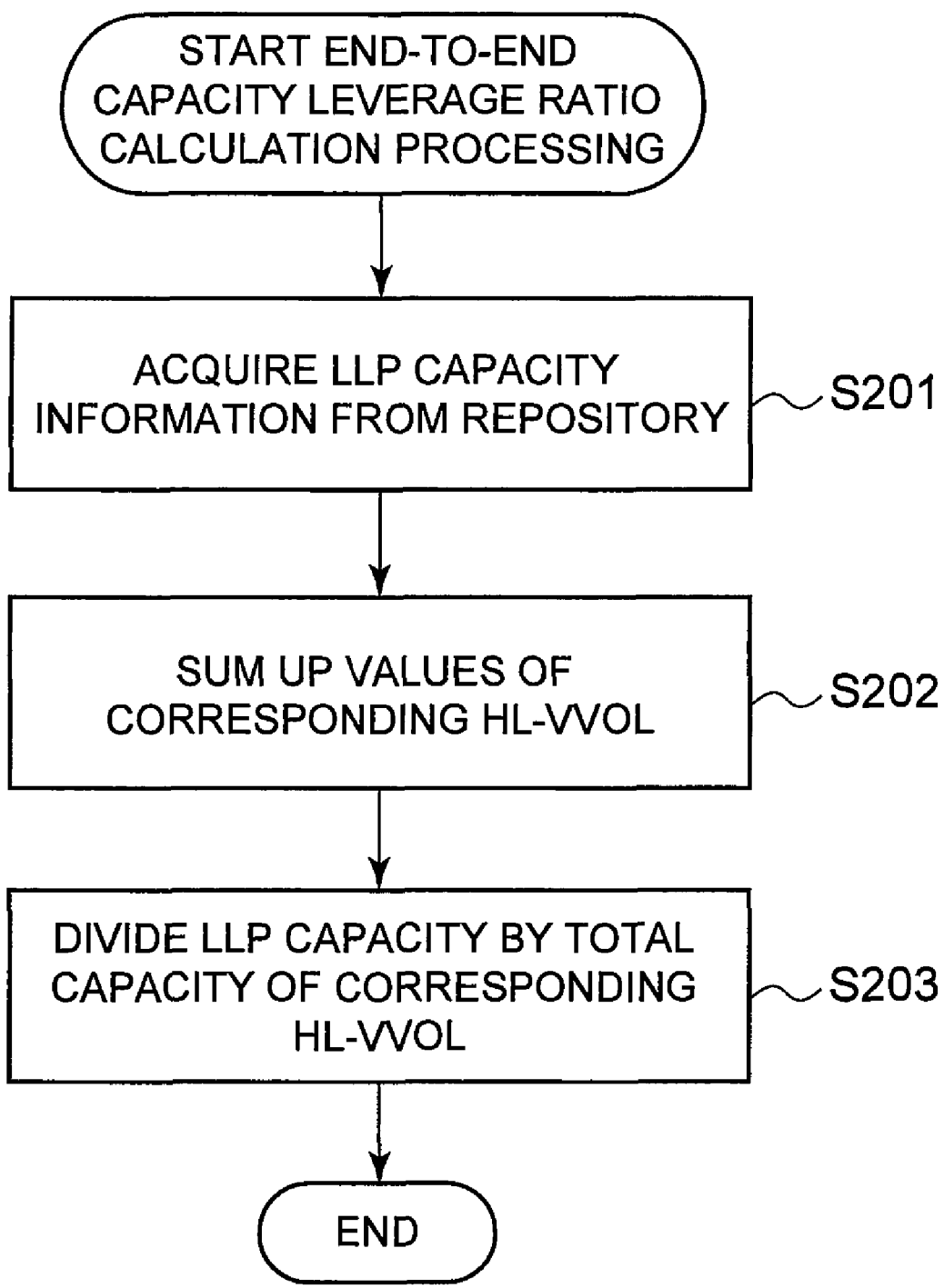
FIG. 15 is a flow diagram of the processing in step S103 in FIG. 14.

FIG. 15 is a flow diagram of the processing in step S103 in FIG. 14. This processing is described below on the basis of the flow diagram.

(Step S201) The leverage management module 1203 sends an inquiry to the storage system 2000 about the capacity of the storage level pool corresponding to the storage level pool identifier 1401 specified in (step A) of step S102 under <6-1-1. Capacity information gathering process>. The storage system 2000 returns the data in the column, storage level pool capacity 11002, of the storage level pool information 11000, to the management server. The leverage management module stores the storage level pool capacity 11002 thus received as the storage level pool capacity 1402 in the storage level pool configuration information 1400.

(Step S202) The leverage management module 1203 adds up the server level virtual volume capacities 1802 gathered by the server management module 1202 in step D of step S102 and stores the result as the corresponding server level virtual volume total capacity 1705 of the server level pool configuration information 1700.

(Step S203) The leverage management module 1203 calculates the ratio of the storage level pool capacity 1402 acquired at step S201 to the value of the corresponding server level virtual volume total capacity 1705 calculated at step S202 and stores the result of this calculation as the end-to-end capacity leverage ratio 1902 in the end-to-end capacity leverage ratio information 1900.

The processing described above is premised on gathering capacity and displaying a leverage ratio in respect of a storage level pool indicated by the administrator, but it is also possible to display the leverage ratio in respect of a plurality of storage level pools which are managed by a management server. The processing in this case involves repeating the processes shown in FIG. 15 and FIG. 16 while the management server 1000 successively designates each one of a plurality of storage level pools 2220, as the "specified storage level pool identifier 1401".

SECOND EMBODIMENT

<7. Overview of Second Embodiment>

In the computer system relating to a second embodiment of the present invention, in addition to the computer system of the first embodiment, if the end-to-end capacity leverage ratio 1902 exceeds an end-to-end capacity leverage ratio threshold value 1911 set by the storage administrator and it is judged that the risk of depletion of the physical storage capacity has increased, then the location which is the cause of the sudden rise in the end-to-end capacity leverage ratio 1902 is identified and information on the identified location is displayed to the storage administrator via a management screen of the management program.

Furthermore, in order to prevent depletion of the physical storage capacity, the management program 1200 implements processing for automatically changing the configuration of the storage system 2000, thereby restricting the leverage ratio to a normal value which does not exceed the end-to-end capacity leverage ratio threshold value 1911.

Furthermore, if a setup operation is accepted by a server virtualization program 3200 which includes a callback object, then that operation is interrupted (the storage control program 2500 may also include a callback object, described hereinafter, instead of or in addition to the server virtualization program 3200). The end-to-end capacity leverage ratio 1902 after execution of the accepted operation is simulated, and if it is judged that the end-to-end capacity leverage ratio 1902 would exceed the end-to-end capacity leverage ratio threshold value 1911 set by the storage administrator, then the management program 1200 automatically carries out configuration change processing for the storage system 2000. By this means, it is possible to achieve a structure where the end-to-end capacity leverage ratio 1902 does not exceed the end-to-end capacity leverage ratio threshold value 1911 set by the storage administrator, even after the server virtualization program 3200 has executed the setup operation. When the processing described above has been carried out successfully by the management program 1200, a success notification is sent to the server virtualization program 3200, and upon receiving this notification, the server virtualization program 3200 restarts the accepted setup operation. On the other hand, if it is judged that the end-to-end capacity leverage ratio 1902 will not be restricted to the end-to-end capacity leverage ratio threshold value 1911 or lower even after the configuration change processing in the storage system 2000 is performed by the management program 1200, then a notification is sent to the management program 1200 indicating that there is a high risk of depletion of the physical storage capacity by the setup operation, and a recommendation to halt the setup operation is issued.

<7-1. Cause Location Identification Processing>

Figure 27:
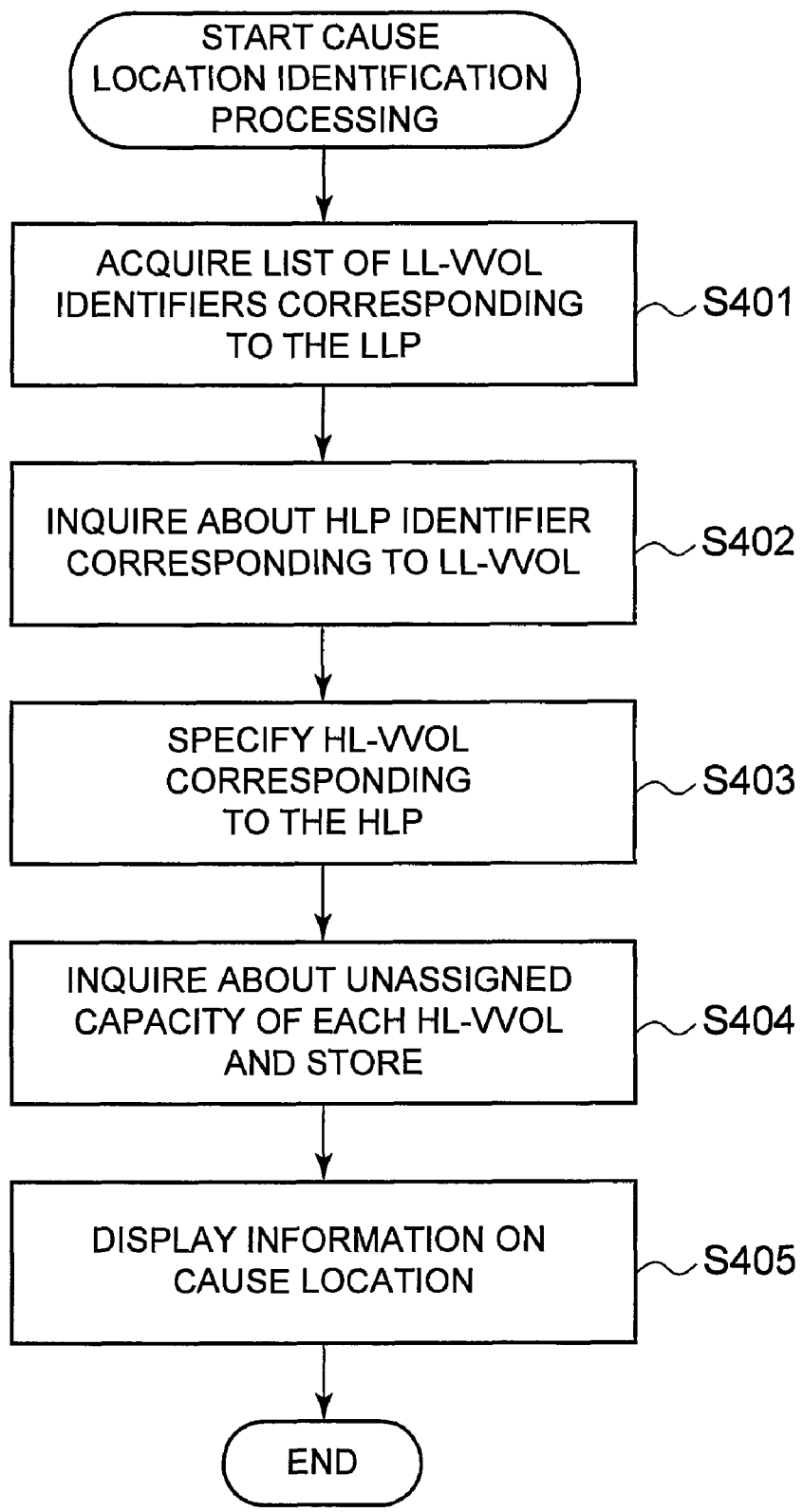
FIG. 27 is a flow diagram of cause location identification processing.

FIG. 27 is a flow diagram of cause location identification processing.

If the end-to-end capacity leverage ratio 1902 calculated at step S105 in <6-1. Processing for calculating end-to-end capacity leverage ratio 1902> according to the first embodiment exceeds the end-to-end capacity leverage ratio threshold value 1911 set by the storage administrator and if it is judged that there is a high possibility of depletion of the physical storage capacity, then information indicating the location that is the cause of the steep rise in the end-to-end capacity leverage ratio 1902 is reported to the storage administrator via the display screen.

(Step S401) The management program 1200 sends an inquiry to the storage system 2000 about the identifier of the storage level virtual volumes corresponding to the storage level pool 2220 in which the end-to-end capacity leverage ratio shows a sharp rise. Upon receiving this inquiry, the storage system 2000 returns the storage level virtual volume identifiers 11005 in the storage level pool information 11000. The management program 1200 stores the received list of the identifiers of storage level virtual volumes 2230, as the corresponding storage level virtual volume identifiers 1404.

(Step S402) The management program 1200 acquires the server level pool identifier 1701 corresponding to the respective storage level virtual volumes 2230 having the acquired storage level virtual volume identifiers 1404. More specifically, for example, the management program 1200 refers to the port/LUN correspondence information 1600 and identifies the LUN 1603 corresponding to the identifier of the storage level virtual volume 2230, which has been registered as an internal volume ID. The management program 1200 sends an inquiry to the physical server 3000 about the identifier of the server level pool 3210 corresponding to the LUN 1603. Upon receiving this, the server virtualization program 3200 of the physical server 3000 identifies the LUN 1603 for which the inquiry has been made, from the configuration storage port number/LUN 1707, and returns the corresponding server level pool identifier 15001 from the server level pool information 15000, to the management server 1000. The management program 1200 of the management server 1000 stores the received server level pool identifier 15001 as the server level pool identifier 1701 of the server level pool configuration information 1700.

(Step S403) The management program 1200 sends an inquiry to the physical server 3000 about the identifiers of the server level virtual volumes 3210 corresponding to the server level pool identifier 1701 acquired at step S402. Upon receiving this, the server virtualization program 3200 of the physical server 3000 returns the server level virtual volume identifiers 15004 corresponding to the server level pool identifier 1701 in the server level pool information 15000, to the management server 1000. The management program 1200 of the management server 1000 stores the received server level pool identifiers 15004 as the corresponding server level virtual volume identifiers 1704 in the server level pool configuration information 1700.

(Step S404) In respect of each of the server level virtual volumes 3220 having the respective corresponding server level virtual volume identifiers 1704 acquired at step S403, the management program 1200 sends an inquiry to the physical server 3000 about the capacity which has been mapped to the storage area of the server level pool 3210, out of the server level virtual volume capacity 1802. Upon receiving this, the server virtualization program 3200 of the physical server 3000 refers to the server level virtual volume information 16000 and returns the server level virtual volume allocated capacity 16003 corresponding to the server level virtual volume identifier 1704, to the management server 1000. The management program 1200 of the management server 1000 stores the received server level virtual volume allocated capacity 16003 as the server level virtual volume allocated capacity 1803 in the server level virtual volume configuration information 1800. Moreover, the management program 1200 subtracts the value of the server level virtual volume allocated capacity 1803 from the server level virtual volume capacity 1802, and stores the result as the server level virtual volume unallocated capacity 1804.

Figure 37:
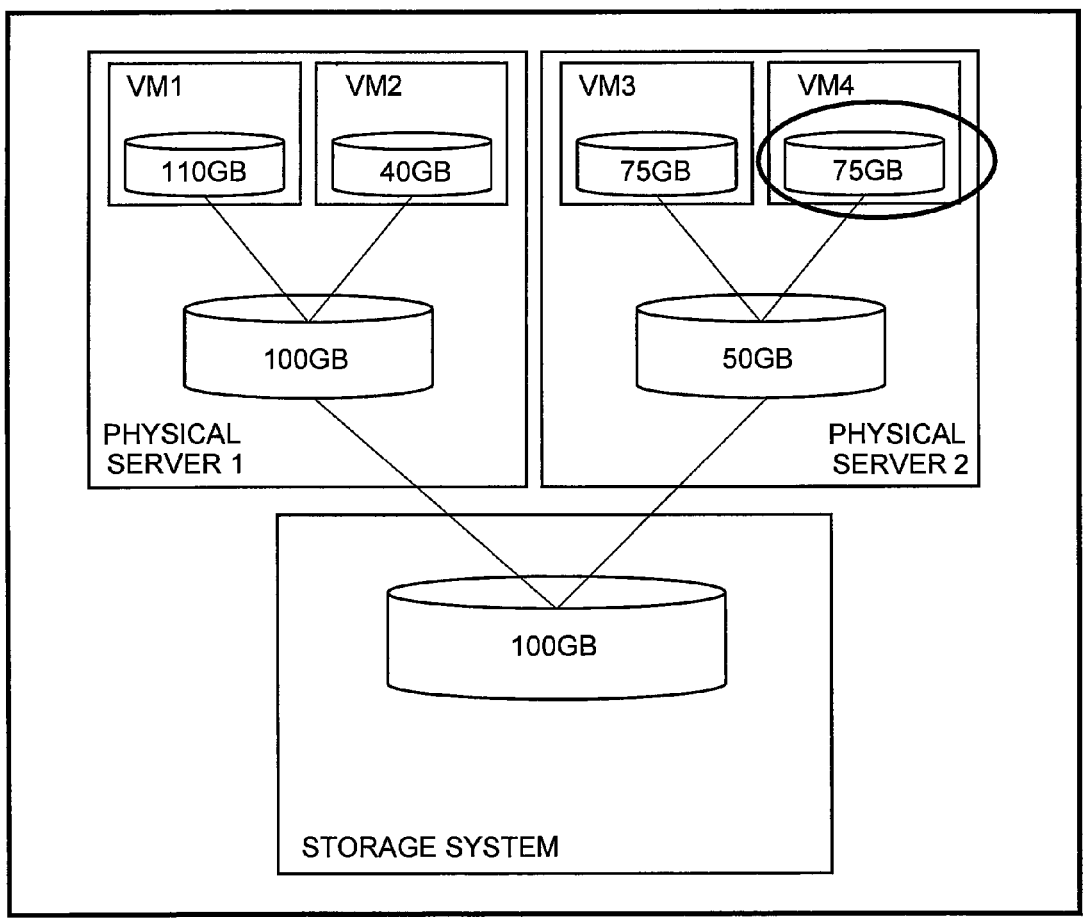
FIG. 37 shows one example of a cause location display screen.

(Step S405) The management program 1200 compares the respective server level virtual volume unallocated capacities 1804 corresponding to the respective server level virtual volume identifiers 1801 calculated in step S404, and identifies the server level virtual volume 3220 having the highest value of the compared server level virtual volume unallocated capacities 1804 as a location causing sudden rise in the end-to-end capacity leverage ratio 1902. The management program 1200 displays a screen showing information such as the identifier, capacity and unallocated capacity of this server level virtual volume 3220. FIG. 37 shows one example of this screen. According to the example in FIG. 37, the server level virtual volume mounted on the virtual machine (VM4) is highlighted (for example, surrounded by a thick oval line) as a cause location. The method of indicating the cause location is not limited to the example shown in FIG. 37, and another method of indicating same may be used.

<7-2. Normal Storage Configuration Change Processing>

Figure 16:
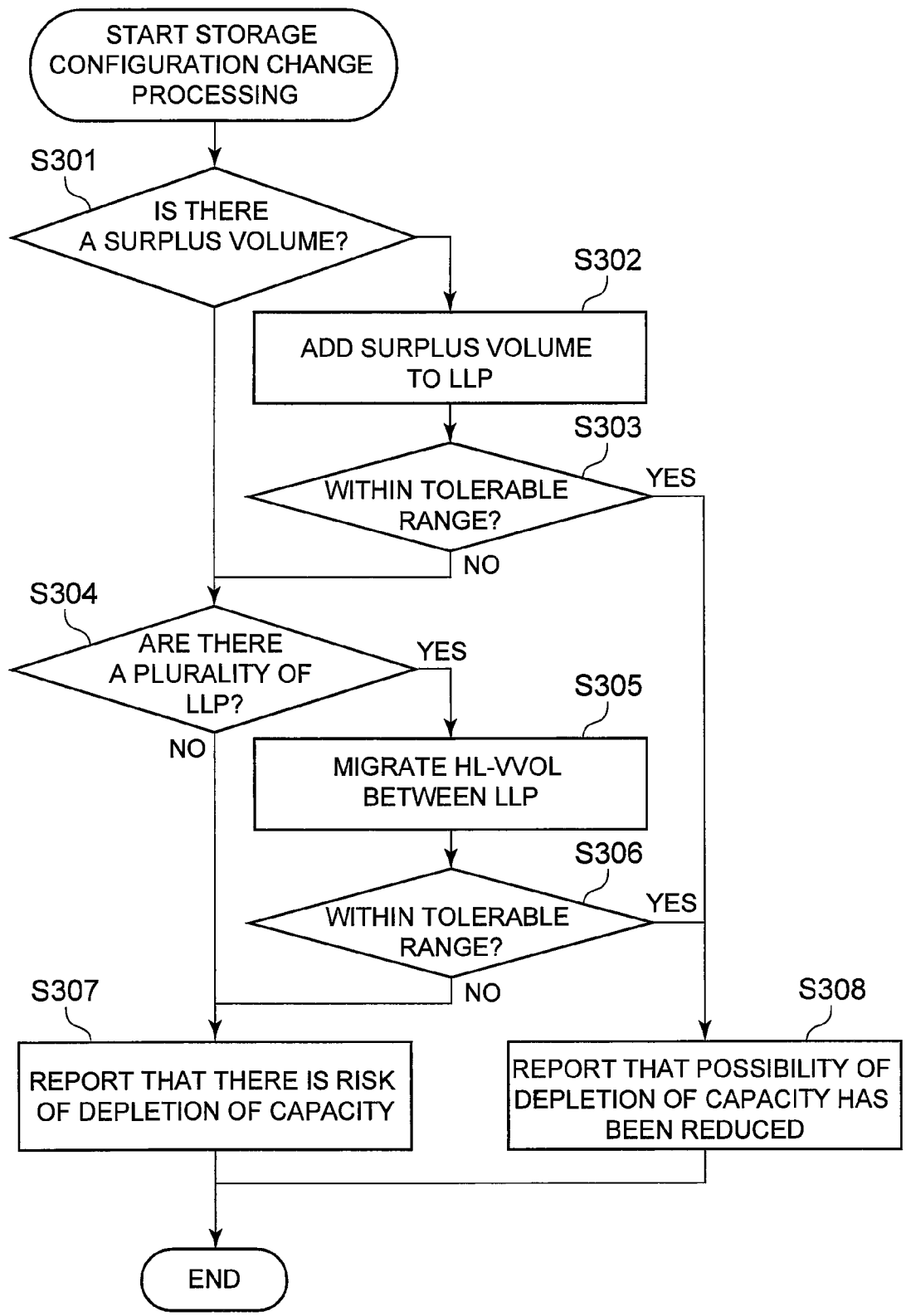
FIG. 16 is a flow diagram of storage configuration change processing.

FIG. 16 is a flow diagram of storage configuration change processing. This processing is performed after carrying out the cause location identification processing. Each of the steps involved is described below.

(Step S301) The management program 1200 checks whether or not there is a volume 2210 that has not been registered in the pool configuration volume identifiers 1406 of the storage level pool configuration information 1400, in other words, whether there is a surplus volume 2210 which does not belong to a storage level pool 2220, in the storage system 2000.

(Step S302) If there is a surplus volume 2210 in the storage system 2000 which does not belong to a storage level pool 2220, then the management program 1200 automatically adds capacity to the storage level pool 2220 by newly setting the surplus volume 2210 to belong to the storage level pool 2220 having the storage level pool identifier 1401 specified in (step A) of step S102 in <6-1-1. Capacity information gathering process> of the first embodiment. The capacity added to the storage level pool 2220 is set by the management program 1200 to a value whereby the end-to-end capacity leverage ratio 1902 is kept equal to or lower than the end-to-end capacity leverage ratio threshold value 1911. The capacity added to the storage level pool 2220 may be set by the storage administrator on the management screen of the physical server 1000.

(Step S303) If, as a result of performing step S302, the end-to-end capacity leverage ratio 1902 is kept at or below the end-to-end capacity leverage ratio threshold value 1911 set by the storage administrator, then the procedure advances to step S308. If, on the other hand, the end-to-end capacity leverage ratio 1902 has exceeded the end-to-end capacity leverage ratio threshold value 1911, then the procedure advance to step S304.

(Step S304) If the end-to-end capacity leverage ratio 1902 has exceeded the end-to-end capacity leverage ratio threshold value 1911 in step S303, then the management program 1200 sends an inquiry to the storage system 2000 about whether there is a storage level pool 2220 other than the storage level pool 2220 in question, in the storage system 2000. If there is another storage level pool, then the management program 1200 sends the storage system 2000 an inquiry with regard to the identifier of the storage level pool 2220 other than the storage level pool 2220 in question, which is the subject of the inquiry. The command control module 2503 of the storage system 2000 refers to the storage level pool information 11000 and returns a storage level pool identifier 11001 other than the identifier of the storage level pool 2220 in question, to the management server 1000. The management program 1200 of the management server 1000 stores the received storage level pool identifier 11001 as a storage level pool identifier 1401 in the storage level pool configuration information 1400, and then proceeds to step S305. If there is no other storage level pool, then the procedure advances to step S308.

(Step S305) The management program 1200 refers to the end-to-end capacity leverage ratio information 1900 and specifies a storage level pool identifier 1401 having a low (for example, the lowest) end-to-end capacity leverage ratio 1902. Image files in the server level virtual volume 3220 are migrated between the storage level pool 2220 in question and the storage level pool 2220 selected at step S305, in such a manner that the end-to-end capacity leverage ratio 1902 of the storage level pool 2220 in question becomes equal to or lower than the end-to-end capacity leverage ratio threshold value 1911. In this case, the server level virtual volume 3220 to be migrated is specified as the server level virtual volume 3220 identified as a cause location of sudden rise in the end-to-end capacity leverage ratio at step S405 in <7-1. Cause location identification processing>. This cause location may be specified automatically as an object for migration. Provided that the server level virtual volume 3220 forming the cause location is migrated to a server level virtual volume corresponding to another storage level pool, then the total capacity of the server level virtual volumes corresponding to the storage level pool which is the migration source decreases, and therefore the end-to-end capacity leverage ratio falls. In this case, desirably, the end-to-end capacity leverage ratio relating to the other storage level pool described above does not exceed the threshold value, even when the server level virtual volume 3220 forming the migration object is migrated. More specifically, for example, it is judged whether or not the end-to-end capacity leverage ratio relating to the other storage level pool exceeds the threshold value if the capacity of the server level virtual volume which is the migration object is added to the total capacity of the server level virtual volumes corresponding to the other storage level pool, and if it is judged that the threshold value is not exceeded, then the other storage level pool can be set as a migration destination.

(Step S306) If, as a result of carrying out step S305, the end-to-end capacity leverage ratio 1902 of the storage level pool 2220 is kept at or below the end-to-end capacity leverage ratio threshold value 1911, then the procedure advances to step S308. On the other hand, if the end-to-end capacity leverage ratio 1902 of the storage level pool 2220 has exceeded the end-to-end capacity leverage ratio threshold value 1911, then the procedure advances to step S307.

(Step S307) A notification is issued indicating that the end-to-end capacity leverage ratio 1902 has exceeded the end-to-end capacity leverage ratio threshold value 1911 set by the storage administrator, even after carrying out step S302 and step S305.

(Step S308) If the end-to-end capacity leverage ratio 1902 has been kept at or below the end-to-end capacity leverage ratio threshold value 1911 in step S302 or step S305, then this fact is reported to the storage administrator.

<7-3. Processing Carried Out by Management Program Using Callback Interface>

Figure 17:
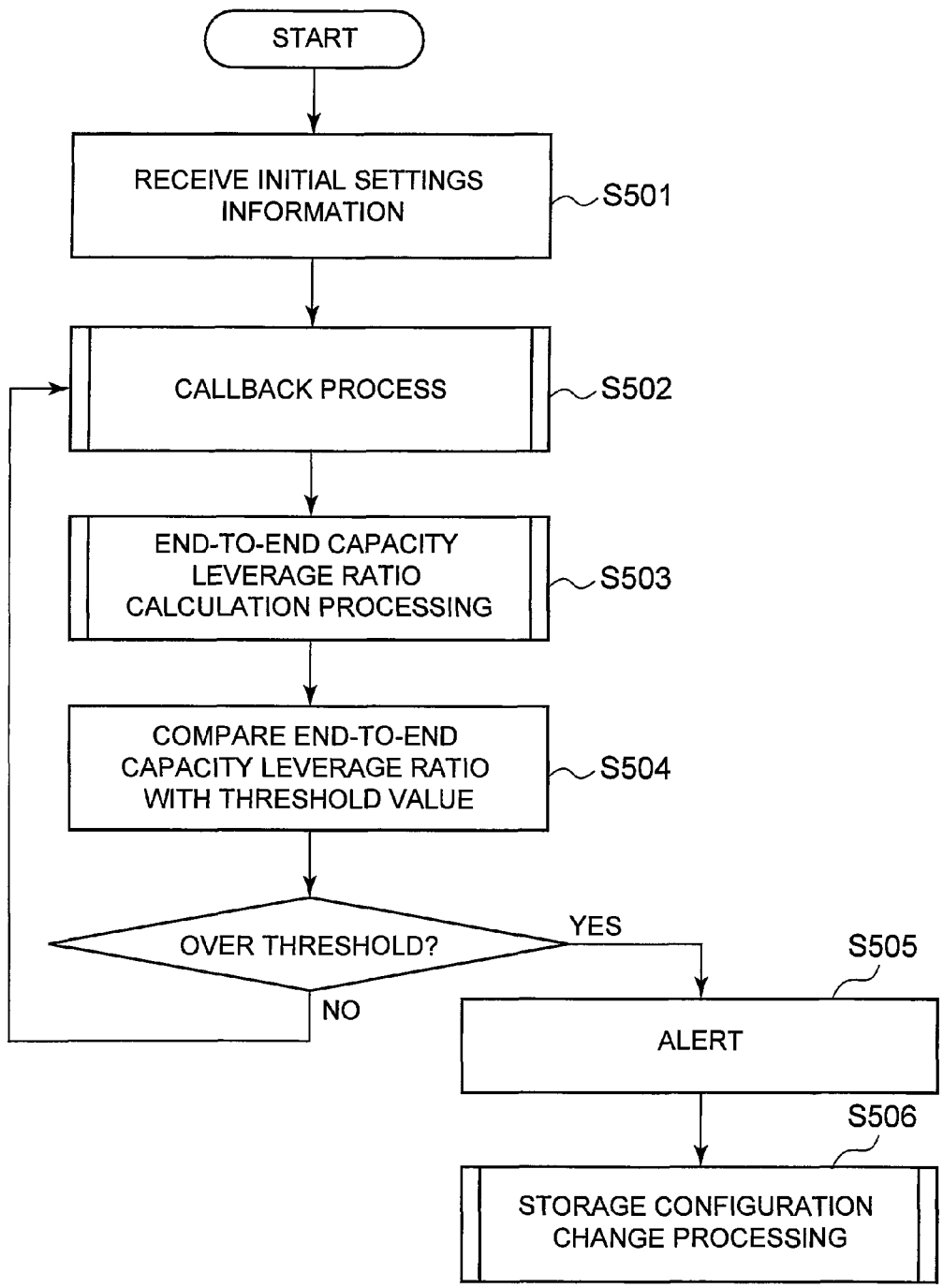
FIG. 17 is a flow diagram showing processing carried out by a management program using a callback interface.

FIG. 17 is a flow diagram showing processing carried out by a management program using a callback interface.

(Step S501) The management program 1200 receives initial settings information 1910 which has been input by the storage administrator via the setup screen of the management program 1200. The threshold value of the end-to-end capacity leverage ratio is input to the initial settings information 1910. The management program 1200 stores the input threshold value as the end-to-end capacity leverage ratio threshold value 1911 in the initial settings information 1910.

(Step S502) Next, a callback process is carried out. The details of the callback process are described here with reference to FIG. 19.

Figure 19:
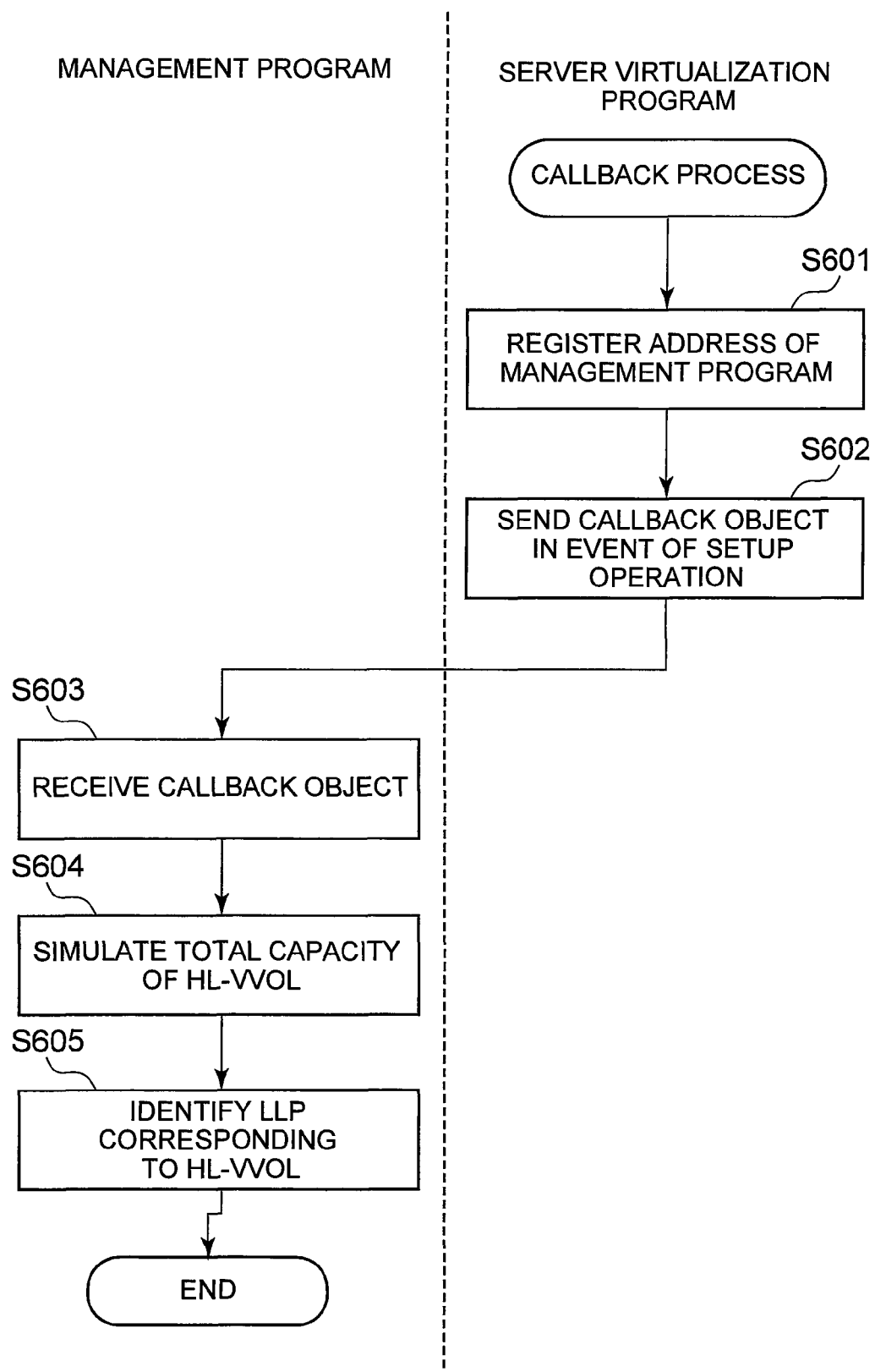
FIG. 19 is a flow diagram of a callback process.

FIG. 19 is a flow diagram of a callback process.

(Step S601) The server virtualization program 3200 registers the address of the management program 1200.

(Step S602) Upon accepting a setup operation event, the server virtualization program 3200 sends a callback object to the management program 1200. The callback object includes the total capacity of the server level virtual volumes 3220 before the execution of the setup operation, and the contents of the setup operation.

(Step S603) The management program 1200 waits for a callback object to be sent from the server virtualization program 3200, and when a callback object arrives from the server virtualization program 3200, the management program 1200 receives this object.

(Step S604) The management program 1200 calculates the total capacity of the server level virtual volumes 3220 after executing the operation accepted by the server virtualization program 3200, by simulation on the basis of the information included in the received callback object.

(Step S605) The management program 1200 identifies the storage level pool 2220 corresponding to the server level virtual volumes 3220 relating to the setup operation. The concrete steps are as follows.

(Step A) The server management module 1202 sends an inquiry to the physical server 3000 about the identifier of the server level pool 3210 which corresponds to the identifier 1801 of the server level virtual volumes relating to the setup operation. Upon receiving this, the server virtualization program 3200 of the physical server 3000 refers to the server level virtual volume information 16000 and returns a server level pool identifier 16004. The management program 1200 stores the server level pool identifier 16004 thus received as the corresponding server level virtual volume identifier 1806 in the server level virtual volume configuration information 1800.

(Step B) Thereupon, the management program 1200 refers to the server level pool configuration information 1700 and identifies a server level pool identifier 1701 which is the same as the corresponding server level pool identifier 1806 in step A. The management program 1200 then sends an inquiry to the physical server 3000 in respect of the storage port number/LUN 1707 corresponding to the identified server level pool 3210. Upon receiving this, the server virtualization program 3200 of the physical server 3000 refers to the server level pool information 15000 and returns a configuration storage port number/LUN 15006 to the management server 1000. The management program 1200 of the management server 1000 stores the received configuration storage port number/LUN 15006 as the configuration storage port number/LUN 1707 of the server level pool configuration information 1700.

(Step C) Thereupon, the management program 1200 refers to the port/LUN correspondence information 1600 and acquires the internal volume ID 1601 corresponding to the configuration storage port number/LUN 1707 acquired in step B.

(Step D) Thereupon, the management program 1200 refers to the storage level virtual volume configuration information 1500 and identifies a storage level virtual volume 2230 having the same identifier as the internal volume ID 1601. The management program 1200 then acquires the corresponding storage level pool identifier 1504 which corresponds to the identified storage level virtual volume 2230.

The description now returns to FIG. 17.

(Step S503) The leverage management module 1203 of the management program 1200 carries out processing for calculating the end-to-end capacity leverage ratio by using the total capacity of the server level virtual volumes 3220 obtained by the callback process, and the capacity information relating to the identified storage level pool 2220. The details of the process for calculating the end-to-end capacity leverage ratio are described later with reference to FIG. 20.

(Step S504) The leverage management module 1203 judges whether the value of the end-to-end capacity leverage ratio 1902 in the end-to-end capacity leverage ratio information 1900 is higher than the end-to-end capacity leverage ratio threshold value 1911 in the initial settings information 1910. If the value 1902 is judged to be higher than the threshold value 1911, then step S505 is executed, whereas if it is not higher, then step S502 is executed.

(Step S505) The leverage management module 1203 displays an alert which announces that the end-to-end capacity leverage ratio 1902 has risen sharply and the possibility of depletion of the physical storage capacity has increased. Moreover, the leverage management module 1203 displays a chart of the value of the end-to-end capacity leverage ratio 1902, the storage level pool capacity 1402, the storage level virtual volume identifier 1501 and the storage level virtual volume capacity 1502, to the storage administrator, on the capacity leverage ratio display screen 1403 of the management program 1200. The information reported on the display screen of the management program 1200 may be information other than that stated above, provided that the information is able to convey to the storage administrator the fact that the possibility of depletion of the physical capacity of the storage level pool 2220 has increased.

In the example described above, the storage level pool capacity 1402 and the server level virtual volume capacity 1802 were used in calculating the end-to-end capacity leverage ratio 1902, but it is also possible to use other values from the tables to which these respective columns belong.

<7-3-1. Details of Processing for Calculating End-to-End Capacity Leverage Ratio in Callback Process>

Figure 20:
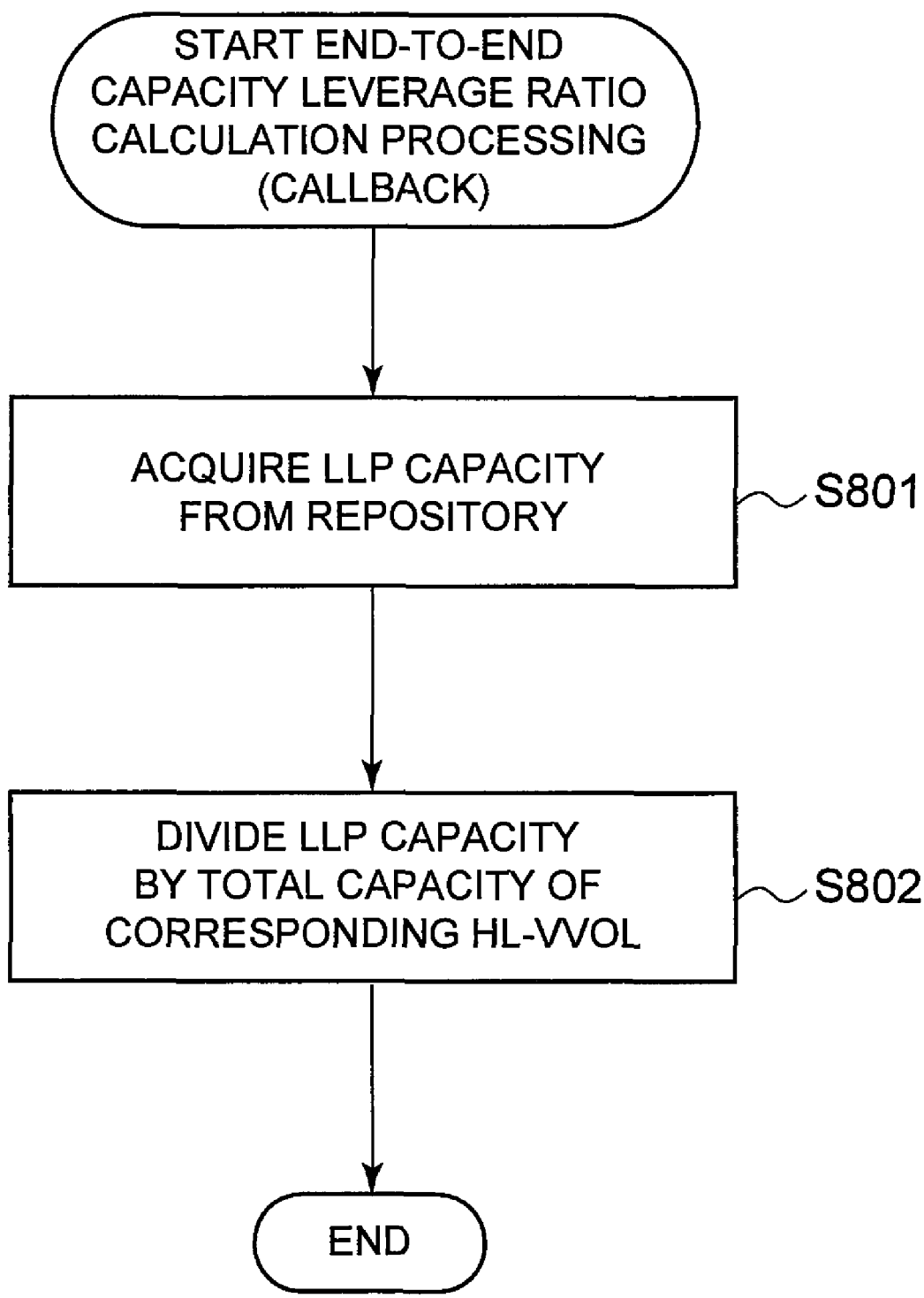
FIG. 20 is a flow diagram of the processing in step S503 in FIG. 17.

FIG. 20 is a flow diagram of the processing in step S503 in FIG. 17.

(Step S801) The leverage management module 1203 refers to the storage level pool configuration information 1400 and acquires the storage level pool capacity 1402 corresponding to the storage level pool identifier 1401 specified in step S605.

(Step S802) The leverage management module 1203 calculates the ratio of the storage level pool capacity 1402 acquired at step S201 under <7-3. Processing performed by management program using callback interface> to the value of the corresponding server level virtual volume total capacity 3220 calculated at step S604, and stores the result of this calculation as the end-to-end capacity leverage ratio 1902 in the end-to-end capacity leverage ratio information 1900.

The processing described above is premised on gathering capacity and displaying an end-to-end leverage ratio in respect of a storage level pool 2220 indicated by the storage administrator, but it is also possible to display the leverage ratio in respect of a plurality of storage level pools 2220 which are managed by a management server 1000. The processing in this case involves repeating the processes shown in FIG. 19 and FIG. 20 while the management server 1000 successively designates each one of a plurality of storage level pools 2220, as the "specified storage level pool identifier 1401".

<7-4. Storage Configuration Change Processing in Callback Process>

Figure 18:
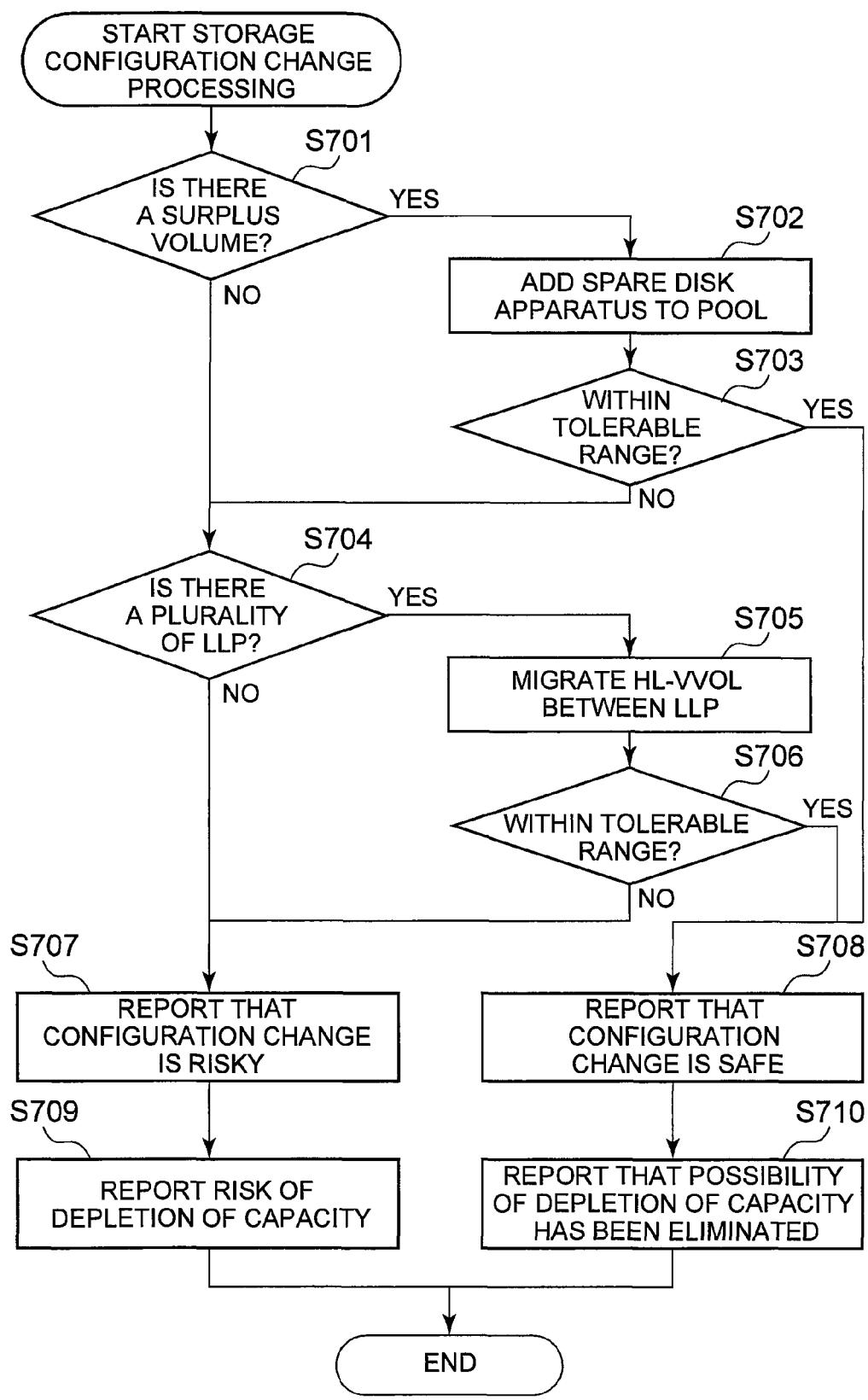
FIG. 18 is a flow diagram of storage configuration change processing in a case where the management program 1200 is provided with a callback interface.

FIG. 18 is a flow diagram of storage configuration change processing in a case where the management program 1200 is provided with a callback interface. This flow is executed from the steps in FIG. 14.

(Step S701) The management program 1200 checks whether or not there is a volume 2210 that has not been registered in the pool configuration volume identifiers 1406 in the storage level pool configuration information 1400, in other words, a surplus volume 2210 which does not belong to a storage level pool 2220, in the storage system 2000.

(Step S702) If there is a surplus volume 2210 in the storage system 2000 which does not belong to a storage level pool 2220, then the management program 1200 automatically adds capacity to the storage level pool 2220 by newly setting the surplus volume 2210 to belong to the storage level pool 2220 having the storage level pool identifier 1401 acquired in step S201 in <7-3. Processing performed by management program using callback interface>. The capacity added to the storage level pool 2220 is set by the management program 1200 to a value whereby the end-to-end capacity leverage ratio 1902 is kept at or below the end-to-end capacity leverage ratio threshold value 1911. The capacity added to the storage level pool 2220 may be set by the storage administrator on the management screen of the physical server 1000.

(Step S703) If, as a result of performing step S302, the end-to-end capacity leverage ratio 1902 is kept at or below the end-to-end capacity leverage ratio threshold value 1911 set by the storage administrator, then the procedure advances to step S308. If, on the other hand, the end-to-end capacity leverage ratio 1902 has exceeded the end-to-end capacity leverage ratio threshold value 1911, then the procedure advance to step S304.

(Step S704) If the end-to-end capacity leverage ratio 1902 has exceeded the end-to-end capacity leverage ratio threshold value 1911 in step S703, then the management program 1200 refers to the storage level pool configuration information 1400 and checks whether there is a storage level pool 2220 other than the storage level pool 2220 in question, in the storage system 2000. If there is another storage level pool, then the procedure advances to step S705. If there is no other storage level pool, then the procedure advances to step S708.

(Step S705) The management program 1200 refers to the end-to-end capacity leverage ratio information 1900 and specifies a storage level pool identifier 1401 having a low (for example, the lowest) end-to-end capacity leverage ratio 1902. Image files in the server level virtual volume 3220 are migrated between the storage level pool 2220 in question and the storage level pool 2220 selected at step S705, in such a manner that the end-to-end capacity leverage ratio 1902 of the storage level pool 2220 in question becomes equal to or lower than the end-to-end capacity leverage ratio threshold value 1911. The server level virtual volume 3220 migrated in this case is specified by the management program 1200 referring to the server level virtual volume configuration information 1800 and setting the volume having the highest server level virtual volume unallocated capacity 1804.

(Step S706) If, as a result of carrying out step S305, the end-to-end capacity leverage ratio 1902 of the storage level pool 2220 is kept at or below the end-to-end capacity leverage ratio threshold value 1911, then the procedure advances to step S708. On the other hand, if the end-to-end capacity leverage ratio 1902 of the storage level pool 2220 exceeds the end-to-end capacity leverage ratio threshold value 1911, then the procedure advances to step S707.

(Step S707) The management program 1200 sends the server virtualization program 3200 a recommendation to halt the setup operation, because there is a high risk of depletion of the storage capacity by executing the setup operation that the server visualization program 3200 is seeking to perform. Upon receiving this, the server visualization program 3200 reconfirms to the server administrator whether or not the setup operation is to be carried out.

(Step S708) The management program 1200 reports to the server virtualization program 3200 that the setup operation it is seeking to carry out is safe. Upon receiving this, the server virtualization program 3200 restarts the setup operation which had been interrupted.

(Step S709) The management program 1200 reports to the storage administrator that there is a high possibility of depletion of the storage capacity.

(Step S710) The management program 1200 notifies the storage administrator that the possibility of depletion of the storage capacity that had increased sharply is now reduced and displays capacity information for the storage level pool 2220, and the like, of which the configuration has been changed.

In the foregoing, several embodiments of the present invention were described, but the present invention is not limited to these embodiments and may of course be modified in various ways without departing from the essence of the invention.

For example, the management server 1000 may carry out processing for making the end-to-end capacity leverage ratio equal to or less than a threshold value (for example, addition of capacity to the storage level pool or migration of a server level virtual volume), without displaying the end-to-end capacity leverage ratio (and/or without displaying other management information).

Furthermore, for example, as shown in FIG. 38, the management server 1000 may display a screen showing both the end-to-end capacity leverage ratio of the storage level pool and the free capacity ratio of the storage level pool, side by side. The free capacity ratio is, for example, the ratio of the unallocated capacity of the storage level pool with respect to the capacity of the storage level pool (the difference between the capacity of the storage level pool and the allocated capacity of the storage level pool).

Moreover, for example, although not shown in the drawings, the management server 1000 may manage the change in the free capacity ratio of the storage level pool (the free capacity ratio at respective time points) and show information representing that change, and calculate and display a recommended end-to-end capacity leverage ratio threshold value for the storage level pool.

Furthermore, the end-to-end capacity leverage ratio threshold value may be different for each storage level pool. More specifically, for example, it is possible to prepare, for each storage level pool, an end-to-end capacity leverage ratio threshold value which is set on the basis of the change in the free capacity ratio of the storage level pool (the speed at which the free capacity ratio decreases). Furthermore, respective threshold values may be prepared for different types of leverage ratio.

In the description given above, the management server 1000 creates settings information (for example, storage level pool configuration information 1400, storage level virtual volume configuration information 1500, port/LUN correspondence information 1600, server level pool configuration information 1700 and server level virtual volume configuration information 1800) by gathering information on the settings applied in the storage system 2000 and physical server 3000, from the storage system 2000 and the physical server 3000, and the management server 1000 calculates and displays an end-to-end capacity leverage ratio. However, if the management server 1000 establishes settings for the storage system 2000 and the physical server 3000 on the basis of setting values received from an administrator or a data source apparatus (for example, a portable storage medium) via an input/output device 4060, then the process of acquiring all or a part of the aforementioned settings information from the storage system 2000 and physical server 3000 can be omitted, the settings information described above can be created or updated on the basis of these settings values, and the end-to-end capacity leverage ratio can be calculated and displayed accordingly. In the latter case, it is possible to assist the setup process performed by the administrator by displaying the end-to-end capacity leverage ratio before the settings based on the settings value are applied to the storage system 2000 or the physical server 3000.

What is claimed is:

1. A computer system, comprising:
a storage system, including a storage device and configured to form one or more volumes belonging to a storage level pool;
a server computer coupled to the storage system and executing a computer program; and
a management system, which comprises at least one computer and is configured to manage the server computer and the storage system,
wherein the storage system is configured to:
 (A) provide a storage level virtual volume relating to the storage level pool, wherein an area in the one or more volumes belonging to the storage level pool is not allocated initially to any portion of the storage level virtual volume;
 (B) store storage level virtual volume information representing a capacity of the storage level virtual volume; and
 (C) send the capacity of the storage level virtual volume to the server computer on the basis of the storage level virtual volume information,
wherein the server computer is configured to:
 (D) manage a server level pool, to which the storage level virtual volume belongs;
 (E) provide a server level virtual volume; and
 (F) store server level virtual volume information representing a capacity of the server level virtual volume;
 (G) in accordance with a write request issued to a server level virtual area from the executed computer program,
  allocate a storage level virtual area, which is a portion of the area in the storage level virtual volume belonging to the server level pool, to the server level virtual area in the server level virtual volume, and
  send a write request specifying the storage level virtual area to the storage system,
wherein the storage system is configured to:
 (H) in accordance with a reception of the write request specifying the storage level virtual area from the server computer, allocate an area in the one or more volumes belonging to the storage level pool to the storage level virtual area,
wherein the management system is configured to:
 (I) identify the server level virtual volume corresponding to the storage level pool on the basis of storage management information representing correspondence between the storage level virtual volume and the storage level pool, and server management information representing correspondence between the server level virtual volume and the storage level virtual volume, and display correspondence information relating to the correspondence between the storage level pool and the identified server level virtual volume,
wherein the storage management information represents a capacity of the storage level pool based on capacities of the one or more volumes belonging to the storage level pool, wherein the server management information represents the capacity of the server level virtual volume, wherein, in (I), the management system is configured to calculate an end-to-end capacity leverage ratio which is a ratio between the capacity of the storage level pool and the capacity of the server level virtual volume corresponding to the storage level pool, and wherein the correspondence information represents the end-to-end capacity leverage ratio.

2. A computer system according to claim 1, comprising:

a plurality of server computers including the server computer and configured to provide a plurality of server level virtual volumes including the server level virtual volume wherein the storage system is configured to configure a plurality of storage level pools including the storage level pool, wherein at least one of the plurality of server computers is configured to provide a virtual computer, wherein the virtual computer is configured to execute virtually a computer program including at least an OS (Operating System), wherein the plurality of server computers is configured to share the server level pool, wherein, in (E), the server computer is configured to provide the virtual computer with the server level virtual volume, wherein the storage management information represents a capacity of the storage level pool based on capacities of the one or more volumes belonging to the storage level pool, wherein the server management information represents the capacity of the server level virtual volume, wherein, in (I), the management system is configured to:
identify, in respect of a certain storage level pool among of the plurality of storage level pools, one or more server level virtual volumes which correspond to the one storage level pool and do not correspond to other storage level pools, from the plurality of server level virtual volumes, and calculate an end-to-end capacity leverage ratio which is a ratio between the capacity of the certain storage level pool and a total capacity of the identified one or more server level virtual volumes, wherein the correspondence information represents the end-to-end capacity leverage ratio, wherein the end-to-end capacity leverage ratio relating to the certain storage level pool is changed in cases where a configuration change is carried out which changes the capacity of the certain storage level pool or the total capacity of the one or more server level virtual volumes, and wherein the end-to-end capacity leverage ratio relating to the certain storage level pool is the same in cases where the virtual computer is moved between the plurality of server computers which shares the server level pool.

3. A computer system according to claim 1,
wherein the management system is configured to increase a number of the one or more volumes belonging to the storage level pool if the end-to-end capacity leverage ratio has exceeded a threshold value.

4. A computer system according to claim 1,
wherein the storage system is configured to configure another storage level pool, and wherein the management system is configured to migrate the data in the first server level virtual volume corresponding to the storage level pool to another server level virtual volume corresponding to the another storage level pool, in cases when the end-to-end capacity leverage ratio corresponding to the storage level pool exceeds the threshold value and in cases when an end-to-end capacity leverage ratio corresponding to the another storage level pool does not exceed a threshold value.

5. A computer system according to claim 1,
wherein the storage management information represents the capacity of the storage level pool by including information representing the capacity of the storage level pool in the storage management information.

6. A computer system according to claim 1,
wherein the storage management information represents the capacity of the storage level pool by including information representing the capacities of the one or more volumes belonging to the storage level pool in the storage management information.

7. A computer system according to claim 1,
wherein, in (I), the management system is configured to display an unallocated capacity of the storage level pool and to display an unallocated capacity of the server level pool corresponding to the server level virtual volume which corresponds to the storage level pool.

8. A computer system according to claim 1,
wherein, in (I), the management system is configured to identify a location causing a poor end-to-end capacity leverage ratio, from a topology from the storage level pool via the storage level virtual volume and the server level pool to the server level virtual volume, on the basis of the storage management information and the server management information, and to display the identified location.

9. A computer system according to claim 8,
wherein the server computer is configured to provide a plurality of server level virtual volumes including the server level virtual volume, wherein the identified location is a certain server level virtual volume in the plurality of server level virtual volumes belonging to the topology, and wherein an unallocated area to the certain server level virtual volume is the largest unallocated areas in the plurality of server level virtual volumes.

10. A computer system according to claim 1,
wherein the management system, via the at least one computer, is configured to execute repeatedly:
an update of the storage management information and the server management information;
an operation of (I); and
a judgment of whether or not the calculated end-to-end capacity leverage ratio has exceeded the threshold value.

11. A computer system according to claim 1,
wherein:
(X) the server computer is configured to detect that the capacity of the server level virtual volume has changed and to report first capacity change information relating to change in the capacity of the server level virtual volume to the management system; and/or
(Y) the storage system is configured to detect that the capacity of the storage level pool has changed and reports second capacity change information relating to change in the capacity of the storage level pool to the management system, and wherein, upon receiving the first or second capacity change information, the management system is configured to:

(i) calculate the end-to-end capacity leverage ratio on the basis of the received first or second capacity change information; and
(ii) judge whether or not the calculated end-to-end capacity leverage ratio has exceeded the threshold value.

12. A management system for managing a storage system and a server computer, comprising:
an interface coupled to a storage system including a storage device configured to form one or more volumes belonging to a storage level pool, and to a server computer configured to execute a computer program;
a storage resource configured to store storage management information and server management information;
a processor configured to update the storage management information and the server management information; and
a display apparatus configured to display a message on a basis of the storage management information and the server management information,
wherein the storage management information represents correspondence between the storage level pool, and a storage level virtual volume to which a portion of an area is allocated from the storage level pool by thin provisioning technology at a storage system,
wherein the server management information represents correspondence between the storage level virtual volume, and a server level virtual volume to which a portion of an area is allocated from the storage level virtual volume belonging to a server level pool by thin provisioning technology at a server level,
wherein the display apparatus is configured to display correspondence information relating to the correspondence between the storage level pool and the server level virtual volume, and
wherein the server level virtual volume corresponding to the storage level pool is identified by the processor, on a basis of the storage management information and the server management information;
wherein the storage management information represents a capacity of the storage level pool based on capacities of the one or more volumes belonging to the storage level pool,
wherein the server management information represents a capacity of the server level virtual volume,
wherein an end-to-end capacity leverage ratio is calculated by the processor, which ratio is a ratio between the capacity of the storage level pool and the capacity of the server level virtual volume corresponding to the storage level pool, and
wherein the correspondence information represents the end-to-end capacity leverage ratio.

13. A computer system, comprising:
a storage system, including a storage device and configured to form one or more volumes belonging to a storage level pool;
a server computer coupled to the storage system and executing a computer program; and
a management system, which comprises at least one computer and is configured to manage the server computer and the storage system,
a plurality of server computers including the server computer and configured to provided a plurality of server level virtual volumes including the server level virtual volume;
wherein the storage system is configured to:
(A) provide a storage level virtual volume relating to the storage level pool, wherein an area in the one or more volumes belonging to the storage level pool is not allocated initially any portion of the storage level virtual volume;
(B) store storage level virtual volume information representing a capacity of the storage level virtual volume; and
(C) send the capacity of the storage level virtual volume to the server computer on the basis of the storage level virtual volume information,
wherein the server computer is configured to:
(D) manage a server level pool, to which the storage level virtual volume belongs;
(E) provide the server level virtual volume; and
(F) store server level virtual volume information representing a capacity of a server level virtual volume;
(G) in accordance with a write request issued to a server level virtual area from the executed computer program,
allocate a storage level virtual area, which is a portion of the area in the storage level virtual volume belonging to the server level pool, to the server level virtual area in the server level virtual volume, and
send sends a write request specifying the storage level virtual area to the storage system,
wherein the storage system is configured to:
(H) in accordance with a reception of the write request specifying the storage level virtual area from the server computer, allocate an area in the one or more volumes belonging to the storage level pool to the storage level virtual area, and
wherein the management system is configured to:
(I) identify the server level virtual volume corresponding to the storage level pool on the basis of storage management information representing correspondence between the storage level virtual volume and the storage level pool, and server management information representing correspondence between the server level virtual volume and the storage level virtual volume, and display correspondence information relating to the correspondence between the storage level pool and the identified server level virtual volume;
wherein the storage system is configured to configure a plurality of storage level pools including the storage level pool,
wherein at least one of the plurality of server computers is configured to provided s a virtual computer,
wherein the virtual computer is configured to execute virtually a computer program including at least an OS (Operating System),
wherein the plurality of server computers is configured to share the server level pool,
wherein, in (E), the server computer is configured to provide the virtual computer with the server level virtual volume,
wherein the storage management information represents a capacity of the storage level pool based on capacities of the one or more volumes belonging to the storage level pool,
wherein the server management information represents the capacity of the server level virtual volume,
wherein, in (I), the management system is configured to identify, in respect of a certain storage level pool among of the plurality of storage level pools, one or more server level virtual volumes which correspond to the one storage level pool and do not correspond to other storage level pools, from the plurality of server level virtual volumes, and calculate an end-to-end capacity leverage ratio which is a ratio between the capacity of the certain storage level pool and a total capacity of the identified one or more server level virtual volumes, wherein the correspondence information represents the end-to-end capacity leverage ratio, wherein the end-to-end capacity leverage ratio relating to the certain storage level pool is changed in cases where a configuration change is carried out which changes the capacity of the certain storage level pool or the total capacity of the one or more server level virtual volumes, and wherein the end-to-end capacity leverage ratio relating to the certain storage level pool is the same in cases where the virtual computer is moved between the plurality of server computers which shares the server level pool.

* * * * *